(12) United States Patent
Park et al.

(10) Patent No.: US 12,450,024 B2
(45) Date of Patent: Oct. 21, 2025

(54) DISPLAY DEVICE AND METHOD FOR SHARING SCREENS OF ELECTRONIC DEVICES

(71) Applicant: Samsung Electronics Co., Ltd., Suwon-si (KR)

(72) Inventors: Sangjun Park, Suwon-si (KR); Seungeon Kim, Suwon-si (KR); Youngwoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/350,277

(22) Filed: Jul. 11, 2023

(65) Prior Publication Data
US 2024/0061637 A1 Feb. 22, 2024

Related U.S. Application Data

(63) Continuation of application No. PCT/KR2023/009597, filed on Jul. 6, 2023.

(30) Foreign Application Priority Data

Aug. 22, 2022 (KR) .......................... 10-2022-0104550

(51) Int. Cl.
*G06F 3/14* (2006.01)
*G06F 3/0482* (2013.01)
*G06F 3/04845* (2022.01)

(52) U.S. Cl.
CPC .......... *G06F 3/1454* (2013.01); *G06F 3/0482* (2013.01); *G06F 3/04845* (2013.01); *G06F 2203/04803* (2013.01)

(58) Field of Classification Search
CPC .. G06F 3/0482; G06F 3/04845; G06F 3/1454; G06F 3/1462; G06F 2203/04803
See application file for complete search history.

(56) References Cited

U.S. PATENT DOCUMENTS 8,700,794 B2    4/2014  Kim et al.
8,791,877 B2 *  7/2014  Kikuchi ................. H04N 7/147
                                                        345/1.3
(Continued)

FOREIGN PATENT DOCUMENTS

EP    3 754 483 A1    12/2020
JP    2016-511603 A    4/2016
(Continued)

OTHER PUBLICATIONS

Search Report and Written Opinion dated Oct. 6, 2023 issued in International Patent Application No. PCT/KR2023/009597.

(Continued)

*Primary Examiner* — Gene W Lee
(74) *Attorney, Agent, or Firm* — Nixon & Vanderhye P.C.

(57) ABSTRACT

A display device may include: a display, a communication interface comprising circuitry configured to transmit and/or receive data to and from a plurality of electronic devices, a memory storing one or more instructions, and at least one processor configured to execute the one or more instructions to: split a screen of the display device into a plurality of regions and obtain pieces of display information respectively corresponding to the plurality of regions, control the communication interface to transmit first display information corresponding to a first region among the plurality of regions to a first electronic device corresponding to the first region among the plurality of electronic devices, receive, from the first electronic device, a first image obtained based on the first display information, and control the display to display the first image in the first region.

19 Claims, 13 Drawing Sheets

(56) References Cited

U.S. PATENT DOCUMENTS

| | | | |
|---|---|---|---|
| 9,635,091 B1* | 4/2017 | Laukkanen | H04M 1/72469 |
| 10,402,592 B2 | 9/2019 | Bae et al. | |
| 10,489,100 B2* | 11/2019 | Jaegal | G06F 3/04883 |
| 10,503,459 B2 | 12/2019 | Lim et al. | |
| 10,521,093 B1* | 12/2019 | Laukkanen | G06F 3/0488 |
| 10,698,530 B2* | 6/2020 | Chung | G06F 3/0416 |
| 10,776,068 B2* | 9/2020 | Hong | H04W 12/50 |
| 10,819,768 B2* | 10/2020 | Laukkanen | G06F 3/0481 |
| 11,206,301 B2* | 12/2021 | Laukkanen | H04L 67/025 |
| 2014/0164966 A1* | 6/2014 | Kim | G06F 16/168 |
| | | | 715/769 |
| 2014/0240445 A1* | 8/2014 | Jaynes | G09G 5/14 |
| | | | 348/14.07 |
| 2015/0097757 A1 | 4/2015 | Bang et al. | |
| 2015/0160913 A1* | 6/2015 | Lee | G09G 5/14 |
| | | | 345/2.2 |
| 2015/0222946 A1* | 8/2015 | Lee | H04N 21/4858 |
| | | | 725/47 |
| 2015/0279329 A1* | 10/2015 | Qiu | G09G 5/14 |
| | | | 345/637 |
| 2015/0294646 A1* | 10/2015 | Lee | G06F 3/1454 |
| | | | 345/2.3 |
| 2016/0253142 A1 | 9/2016 | Choi et al. | |
| 2017/0214862 A1* | 7/2017 | Matsubara | G06F 3/0304 |
| 2019/0250759 A1* | 8/2019 | Chung | G06F 3/0488 |
| 2020/0057589 A1 | 2/2020 | Jo et al. | |
| 2022/0129230 A1* | 4/2022 | Ma | G06F 3/1454 |
| 2022/0374136 A1* | 11/2022 | Chang | G06F 3/04845 |
| 2024/0053944 A1* | 2/2024 | Jia | G09G 5/14 |
| 2024/0053945 A1* | 2/2024 | Fujimaki | G06F 3/0486 |

FOREIGN PATENT DOCUMENTS

| | | |
|---|---|---|
| KR | 101253492 B1 | 4/2013 |
| KR | 10-2015-0067521 | 6/2015 |
| KR | 101557504 B1 | 10/2015 |
| KR | 10-2016-0029551 | 3/2016 |
| KR | 10-2016-0042739 | 4/2016 |
| KR | 10-1730315 | 4/2017 |
| KR | 10-2018-0109340 A | 10/2018 |
| KR | 101935511 B1 | 1/2019 |
| KR | 102087987 B1 | 3/2020 |
| KR | 10-2021-0120589 | 10/2021 |
| KR | 102341301 B1 | 12/2021 |
| KR | 102345610 B1 | 12/2021 |

OTHER PUBLICATIONS

Extended European Search Report dated Jun. 30, 2025 for EP Application No. 23857548.4.

* cited by examiner

DISPLAY DEVICE AND METHOD FOR SHARING SCREENS OF ELECTRONIC DEVICES

CROSS-REFERENCE TO RELATED APPLICATIONS

This application is a continuation of International Application No. PCT/KR2023/009597 designating the United States, filed on Jul. 6, 2023, in the Korean Intellectual Property Receiving Office and claiming priority to Korean Patent Application No. 10-2022-0104550, filed on Aug. 22, 2022, in the Korean Intellectual Property Office, the disclosures of which are incorporated by reference herein in their entireties.

BACKGROUND

Field

The disclosure relates to a display device for sharing screens of a plurality of electronic devices and an operation method of the display device, and an electronic device for sharing a screen on the display device and an operation method of the electronic device.

Description of Related Art

Using short-range wired/wireless communication networks, a function of sharing a screen of a personal electronic device (a source device) on a display device such as a large screen may be utilized. This screen sharing function allows each of a plurality of source devices to simultaneously share all or a part of its screen on a display device. Screen sharing between a plurality of source devices and a display device may be performed through a direct communication connection between each of the source devices and the display device without requiring a separate server.

In general, a display device transmits native resolution information to source devices, and the source devices each transmit an image to be shared to the display device based on the native resolution of the display device. The display device displays images received from the source devices. In this case, image data received from each source device may be image data having the native resolution of the display device, which does not take into account a state of a region where the image data is actually displayed on the display device.

SUMMARY

Embodiments of the disclosure provide a display device that may share screens of a plurality of electronic devices.

According to an example embodiment of the disclosure, the display device may include: a display, a communication interface comprising circuitry configured to transmit and receive data to and from a plurality of electronic devices, a memory storing one or more instructions, and at least one processor configured to execute the one or more instructions.

The at least one processor may be configured to execute the one or more instructions to: split a screen of the display device into a plurality of regions and obtain pieces of display information respectively corresponding to the plurality of regions.

The at least one processor may be configured to execute the one or more instructions to: control the communication interface to transmit first display information corresponding to a first region among the plurality of regions to a first electronic device corresponding to the first region among the plurality of electronic devices.

The at least one processor may be configured to execute the one or more instructions to: control the communication interface to transmit second display information corresponding to a second region among the plurality of regions to a second electronic device corresponding to the second region among the plurality of electronic devices.

The at least one processor may be configured to execute the one or more instructions to: control the communication interface to receive, from the first electronic device, a first image obtained based on the first display information and receive, from the second electronic device, a second image obtained based on the second display information.

The at least one processor may be configured to execute the one or more instructions to: control the display to display the first image in the first region and the second image in the second region.

Embodiments of the disclosure may provide an electronic device according to that may share a screen thereof on a display device.

According to an example embodiment of the disclosure, the electronic device may include: a display, a communication interface including circuitry configured to transmit and receive data to and from the display device, a memory storing one or more instructions, and at least one processor configured to execute the one or more instructions.

The at least one processor may be configured to execute the one or more instructions to: control the communication interface to receive first display information from the display device.

The at least one processor may be configured to execute the one or more instructions to: scale, based on the first display information, an image in a target region to be shared on a screen displayed on the display.

The at least one processor may be configured to execute the one or more instructions to: control the communication interface to transmit a scaled image to the display device.

The at least one processor may be configured to execute the one or more instructions to: control the display to display a notification message based on the first display information being different from second display information regarding the target region to be shared.

Embodiments of the disclosure may provide a method of operating a display device for sharing screens of a plurality of electronic devices that may include splitting a screen of the display device into a plurality of regions.

According to an example embodiment of the disclosure, the method of operating the display device may include obtaining pieces of display information respectively corresponding to the plurality of regions.

According to an example embodiment of the disclosure, the method of operating the display device may include transmitting first display information corresponding to a first region among the plurality of regions to a first electronic device corresponding to the first region among the plurality of electronic devices.

According to an example embodiment of the disclosure, the method of operating the display device may include transmitting second display information corresponding to a second region among the plurality of regions to a second electronic device corresponding to the second region among the plurality of electronic devices.

According to an example embodiment of the disclosure, the method of operating the display device may include receiving, from the first electronic device, a first image obtained based on the first display information.

According to an example embodiment of the disclosure, the method of operating the display device may include receiving, from the second electronic device, a second image obtained based on the second display information.

According to an example embodiment of the disclosure, the method of operating the display device may include displaying the first image in the first region and the second image in the second region.

According to an example embodiment, a method of operating an electronic device for sharing a screen thereof on a display device, may include receiving first display information from the display device.

According to an example embodiment of the disclosure, the method of operating the electronic device may include scaling, based on the first display information, an image in a target region to be shared on a screen displayed on a display.

According to an example embodiment of the disclosure, the method of operating the electronic device may include transmitting a scaled image to the display device.

According to an example embodiment of the disclosure, the method of operating the electronic device may include displaying a notification message based on the first display information being different from second display information regarding the target region to be shared.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
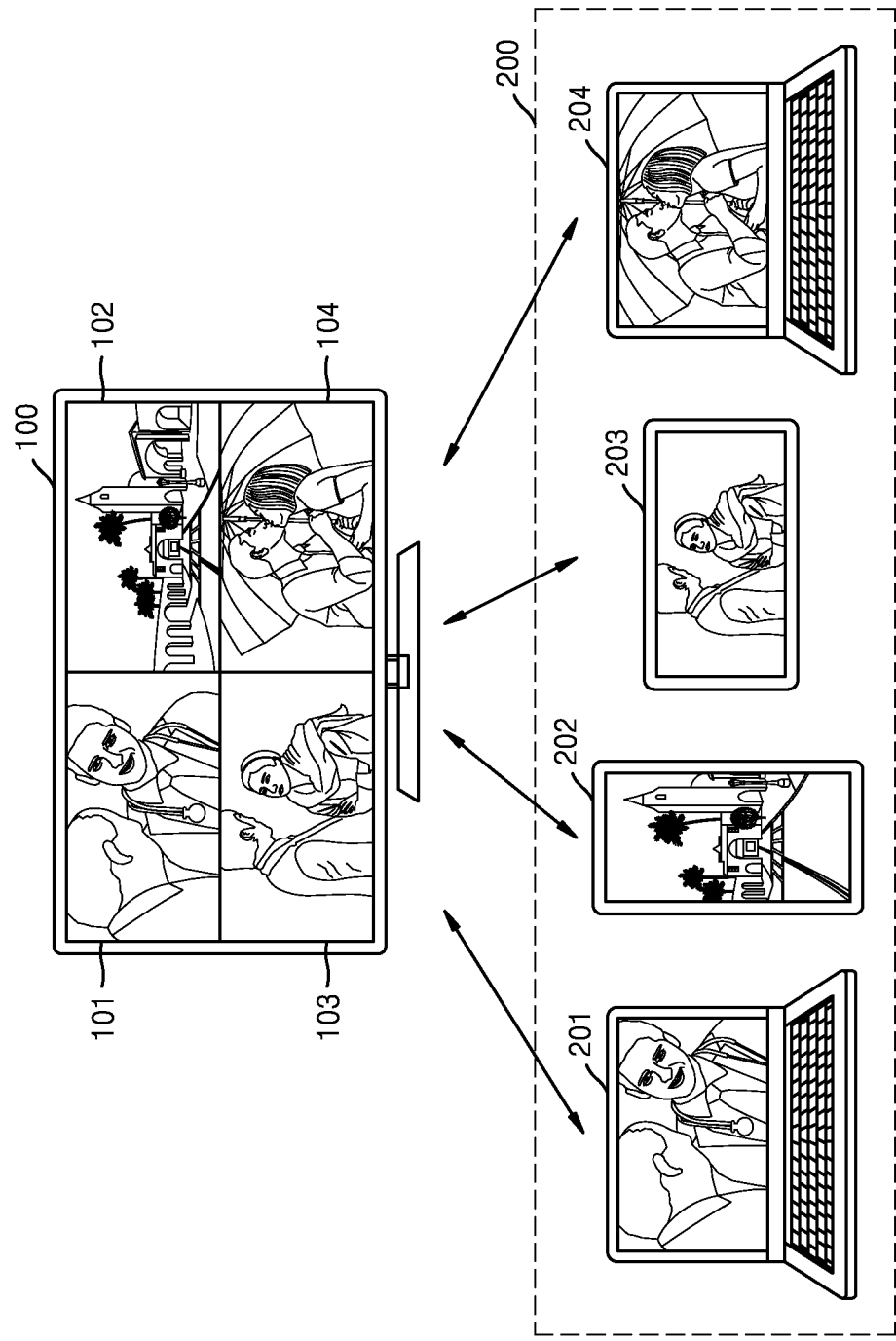
FIG. 1 is a diagram illustrating an example screen sharing system according to various embodiments.

Throughout the disclosure, the expression "at least one of a, b or c" indicates only a, only b, only c, both a and b, both a and c, both b and c, all of a, b, and c, or variations thereof.

Terms used in the disclosure will now be briefly described and then the disclosure will be described in greater detail.

As the terms used herein, general terms that are currently widely used are selected by taking functions according to the disclosure into account, but the terms may be changed according to the intention of one of ordinary skill in the art, precedent cases, advent of new technologies, or the like. Furthermore, various terms may be arbitrarily selected, and in this case, the meaning of the selected terms will be described in detail in the detailed description of the disclosure. Thus, the terms used herein should be defined not by simple appellations thereof but based on the meaning of the terms together with the overall description of the disclosure.

Throughout the disclosure, when a part "includes" or "comprises" an element, unless there is a particular description contrary thereto, it is understood that the part may further include other elements, not excluding the other elements. In addition, terms such as "portion", "module", etc., described in the disclosure, refer to a unit for processing at least one function or operation and may be implemented as hardware or software, or a combination of hardware and software.

Embodiments of the disclosure will be described more fully hereinafter with reference to the accompanying drawings t. However, embodiments of the disclosure may have different forms and should not be construed as being limited to the various example embodiments thereof set forth herein. In addition, parts not related to descriptions of the disclosure may be omitted to clearly explain embodiments of the disclosure in the drawings, and like reference numerals denote like elements throughout.

In an embodiment of the disclosure, the term "user" may refer to a person who controls a system, a function, or an operation, and may include a developer, an administrator, or an installation technician.

In addition, in an embodiment of the disclosure, an 'image' or a 'picture' may refer to a still image, a moving picture including a plurality of consecutive still images (or frames), or a video.

FIG. 1 is a diagram illustrating an example screen sharing system according to various embodiments.

Referring to FIG. 1, a screen sharing system according to an embodiment of the disclosure may include a display device 100 and a plurality of electronic devices 200.

The plurality of electronic devices 200 according to an embodiment of the disclosure may transmit and/or receive data to or from the display device 100 using a wired or wireless communication method. For example, the plurality of electronic devices 200 may each perform communication for sharing their screens on the display device 100. Also, the display device 100 may perform communication for sharing the screens of the plurality of electronic devices 200 on the display device 100.

According to an embodiment of the disclosure, the display device 100 may be communicatively connected to each of the plurality of electronic devices 200 via a wired or wireless communication interface. For example, the wired communication interface may include a high-definition multimedia interface (HDMI), a universal serial bus (USB), an optical interface, a D-subminiature (D-sub), a digital visual interface (DVI), a display port, etc. Also, the wireless communication interface may include a WiFi module, a Bluetooth module, etc.

Furthermore, the display device 100 according to an embodiment of the disclosure may share data with each of the plurality of electronic devices 200 using a Web Real-Time Communication (RTC) scheme. For example, Web RTC may refer to a peer-to-peer (P2P) communication scheme that enables direct data transfer without a central server, which allows real-time sharing of audio, video, data, etc. on the web without the need for a separate plug-in or software. However, the disclosure is not limited thereto, and the display device 100 may communicate with each of the plurality of electronic devices 200 using various wired or wireless communication methods.

According to an embodiment of the disclosure, the display device 100 and the plurality of electronic devices 200 may be implemented in various forms such as TVs including a display, smart monitors, mobile phones, tablet PCs, digital cameras, camcorders, laptop computers, desktops, e-book terminals, digital broadcasting terminals, personal digital assistants (PDAs), portable multimedia players (PMPs), navigation devices, MP3 players, wearable devices, etc. Also, the display device 100 and the plurality of electronic devices 200 may be stationary electronic devices placed at fixed locations or mobile electronic devices having a portable form, and may be digital broadcasting receivers capable of receiving digital broadcasting. However, the disclosure is not limited thereto.

According to an embodiment of the disclosure, the plurality of electronic devices 200 may share, on the display device 100, the entire screens or parts of the screens displayed on the plurality of electronic devices 200.

According to an embodiment of the disclosure, the display device 100 may split its screen into a plurality of regions and respectively display shared screens received from the plurality of electronic devices 200 in the plurality of regions. For example, the display device 100 may divide its screen into four regions based on the number of the plurality of electronic devices 200 connected to share their screens. The display device 100 may display a shared screen received from a first electronic device 201 among the plurality of electronic devices 200 in a first region 101, a shared screen received from a second electronic device 202 in a second region 102, a shared screen received from a third electronic device 203 in a third region 103, and a shared screen received from a fourth electronic device 204 in a fourth region 104.

In this case, when the display device 100 transmits a native resolution of the display device 100 to the plurality of electronic devices 200 without considering the sizes of regions where shared screens are actually played, the plurality of electronic devices 200 transmit image streams (shared screens) having the native resolution of the display device 100 to the display device 100.

Because the display device 100 simultaneously plays four shared screens on the screen, the four shared screens are each displayed at a quarter (¼) of the native resolution of the display device 100. Therefore, the display device 100 decodes the video streams received from the plurality of electronic devices 200 and downscales the decoded image streams to ¼ of the resolution of the decoded image streams to thereby display the resultant images respectively on the first to fourth regions 101, 102, 103, and 104). As a result, because the plurality of electronic devices 200 each transmit, to the display device 100, an image stream having a resolution four times the resolution of an actually displayed image stream, network traffic is unnecessarily wasted. In addition, in order for the display device 100 to decode the image streams received from the plurality of electronic devices 200 and downscale the resolution to ¼, high-performance calculation is required, which may hamper the display device 100 from performing other functions.

According to an embodiment of the disclosure, the display device 100 may transmit pieces of display information regarding the regions where the shared screens are displayed to the plurality of electronic devices 200 respectively corresponding to the regions. For example, the display device 100 may transmit display information on the first region 101 to the first electronic device 201, display information on the second region 102 to the second electronic device 202, display information on the third region 103 to the third electronic device 203, and display information on the fourth region 104 to the fourth electronic device 204.

Accordingly, each of the plurality of electronic devices 200 may scale an image to be shared based on the display information received from the display device 100 and transmit a scaled image to the display device 100. As a result, waste of unnecessary network traffic may be prevented and/or reduced, and the number of computations required for screen sharing on the display device 100 may be reduced.

A method of sharing a screen between the display device 100 and each of the plurality of electronic devices 200, according to an embodiment of the disclosure, is described in detail below with reference to the drawings.

Figure 2:
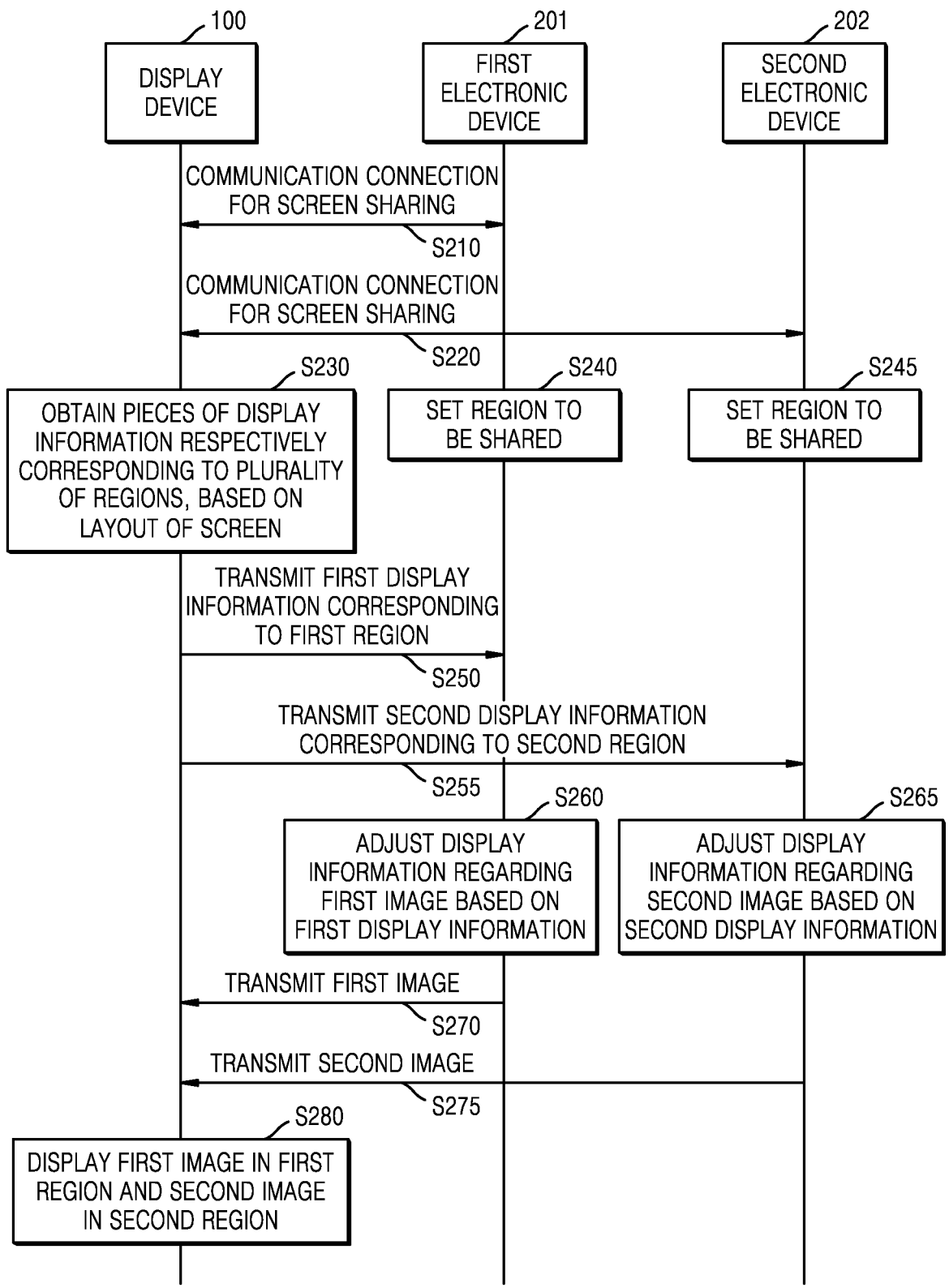
FIG. 2 is a signal flow diagram illustrating an example method, performed by a display device and a plurality of electronic devices, of performing screen sharing therebetween, according to various embodiments.

FIG. 2 is a signal flow diagram illustrating an example method, performed by a display device and a plurality of electronic devices, of performing screen sharing, according to various embodiments.

Referring to FIG. 2, according to an embodiment of the disclosure, a display device 100 may perform communication connections for screen sharing with a first electronic device 201 and a second electronic device 202 (S210 and S220).

For example, the first and second electronic devices 201 and 202 may each request a communication connection for screen sharing from the display device 100. The first and second electronic devices 201 and 202 may each execute an application for screen sharing. The first electronic device 201 and the second electronic device 202 may each search for the display device 100 using an application for screen sharing and request a communication connection for screen sharing from the found display device 100.

The display device 100 may search for the first electronic device 201 and the second electronic device 202 using an application for screen sharing and request communication connections for screen sharing respectively from the found first electronic device 201 and the second electronic device 202. However, the disclosure is not limited thereto.

According to an embodiment of the disclosure, the display device 100 may receive connection requests respectively from the first electronic device 201 and the second electronic device 202, and perform communication connections with the first electronic device 201 and the second electronic device 202. When the communication connection between the display device 100 and the first electronic device 201 is completed, a message indicating that screen sharing is possible may be output to the first electronic device 201. In addition, when the communication connection between the display device 100 and the second electronic device 202 is completed, a message indicating that screen sharing is possible may be output to the second electronic device 202. Furthermore, the display device 100 may display a list of connected devices including the first electronic device 201 and the second electronic device 202 for which the communication connections with the display device 100 have been completed. However, the disclosure is not limited thereto.

According to an embodiment of the disclosure, the display device 100 may share screens of a plurality of electronic devices connected thereto.

The display device 100 may split its screen into a plurality of regions based on a layout of the screen and obtain pieces of display information respectively corresponding to the plurality of regions (S230).

The display device 100 may transmit the pieces of display information respectively corresponding to the plurality of regions to a plurality of electronic devices respectively corresponding to the plurality of regions. For example, the display device 100 may transmit first display information corresponding to a first region among the plurality of regions to the first electronic device 201 corresponding to the first region (S250).

According to an embodiment of the disclosure, display information regarding a region may include at least one of a size, a resolution, or an aspect ratio of the corresponding region. However, the disclosure is not limited thereto.

Also, when the first electronic device 201 corresponds to the first region, it may be understood that a shared image received from the first electronic device 201 is displayed in the first region.

The display device 100 may transmit second display information corresponding to a second region among the plurality of regions to the first electronic device 202 corresponding to the second region (S255). When the second electronic device 202 corresponds to the second region, it may be understood that a shared image received from the second electronic device 202 is displayed in the second region.

According to an embodiment of the disclosure, the first electronic device 201 and the second electronic device 202 may respectively set, on screens thereof, target regions to be shared on the display device 100 (S240 and S245).

For example, the first electronic device 201 and the second electronic device 202 may each set the entire display screen thereof as a target region to be shared. Alternatively, the first electronic device 201 and the second electronic device 202 may each set a part of the display screen as a target region to be shared. For example, the first electronic device 201 and the second electronic device 202 may each set an execution window of a specific application displayed on the display screen thereof as a target region to be shared. In this case, a size of the execution window of the application may be changed based on a user input, and accordingly, a size of the target region to be shared may also be changed.

According to an embodiment of the disclosure, the first electronic device 201 may adjust, based on the first display information received from the display device 100, display information regarding a first image in the target region set in operation S240 (S260).

For example, the first electronic device 201 may adjust, based on the first display information, at least one of a size, a resolution, or an aspect ratio of the first image displayed in the first region set as the target region to be shared. When the first display information includes a first resolution (e.g., 1920×1080) and the resolution of the first image is a second resolution (e.g., 1280×720), the first electronic device 201 may scale the first image to have the first resolution. Alternatively, when the first display information includes a first aspect ratio (e.g., 16:9) and the aspect ratio of the first image is a second aspect ratio (e.g., 4:3), the first electronic device 201 may scale the first image to have the first aspect ratio. However, the disclosure is not limited thereto.

The electronic device 201 may transmit, to the display device 100, the first image whose display information has been adjusted (S270).

Furthermore, according to an embodiment of the disclosure, the second electronic device 202 may adjust, based on the second display information received from the display device 100, display information regarding a second image in the target region set in operation S245 (S265).

For example, the second electronic device 202 may adjust, based on the second display information, at least one of a size, a resolution, or an aspect ratio of the second image displayed in the second region set as the target region to be shared. When the second display information includes a third resolution (e.g., 1280×720) and the resolution of the second image is a fourth resolution (e.g., 1920×1080), the second electronic device 202 may scale the second image to have the third resolution. Alternatively, when the second display information includes a third aspect ratio (e.g., 4:3) and the aspect ratio of the second image is a fourth aspect ratio (e.g., 16:9), the second electronic device 202 may scale the second image to have the third aspect ratio. However, the disclosure is not limited thereto.

The second electronic device 202 may transmit, to the display device 100, the second image whose display information has been adjusted (S275).

According to an embodiment of the disclosure, the display device 100 may display the first image received from the first electronic device 201 in the first region, and the second image received from the second electronic device 202 in the second region (S280).

Figure 3:
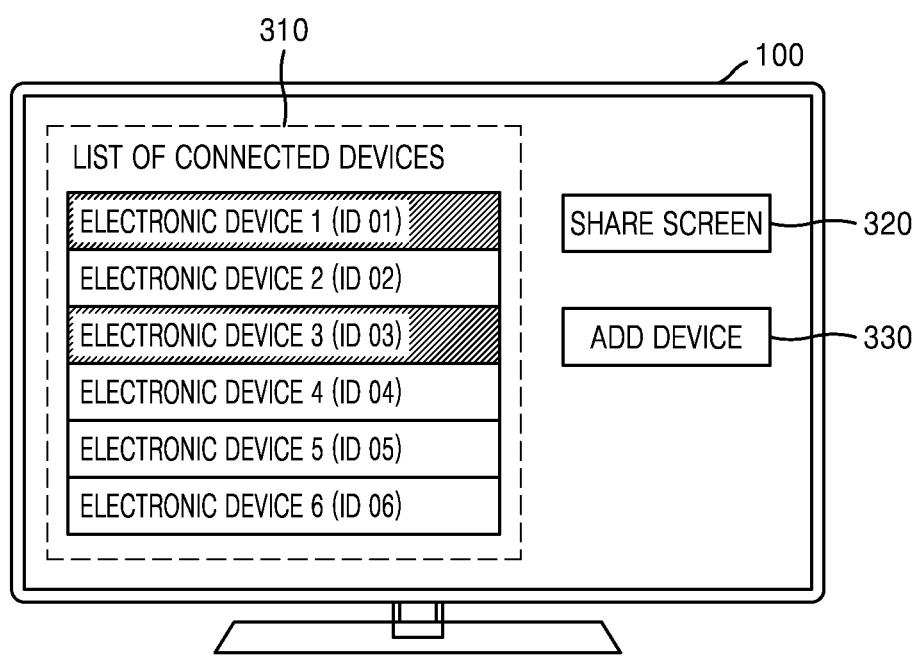
FIG. 3 is a diagram illustrating an example in which a display device displays a list of external electronic devices connected thereto, according to various embodiments.

FIG. 3 is a diagram illustrating an example in which a display device displays a list of external electronic devices connected thereto, according to various embodiments.

Referring to FIG. 3, according to an embodiment of the disclosure, the display device 100 may execute an application for screen sharing based on a user input. For example, the display device 100 may receive, from a control device, a control signal, a control command, or the like corresponding to a user input. The control device may include a remote control, a keyboard, a mouse, etc., and may exchange data, information, signals, etc. with the display device 100 through wired or wireless communication. However, the disclosure is not limited thereto.

When an application for screen sharing is executed, the display device 100 may display a list 310 indicating external electronic devices whose screens are capable of being shared on the display device 100 when communication connections with the display device 100 are completed. For example, the list 310 may include, but is not limited to, a device type, a model name, identification information, etc. of each of the external electronic devices.

The display device 100 may receive a user input for selecting at least one electronic device whose screen is to be shared from the list 310 and selecting a screen sharing item 320. Based on the user input, the display device 100 may determine the at least one electronic device whose screen is to be shared and perform screen sharing with the determined at least one electronic device. For example, the display device 100 may perform screen sharing with electronic device 1 and electronic device 3 selected from the list 310.

Alternatively, the display device 100 may add a new electronic device for screen sharing based on a user input for selecting a device addition item 330. For example, the display device 100 may search for a new electronic device not included in the list 310 and add the found new electronic device to the list 310 when a communication connection with the new electronic device is completed.

Figure 4:
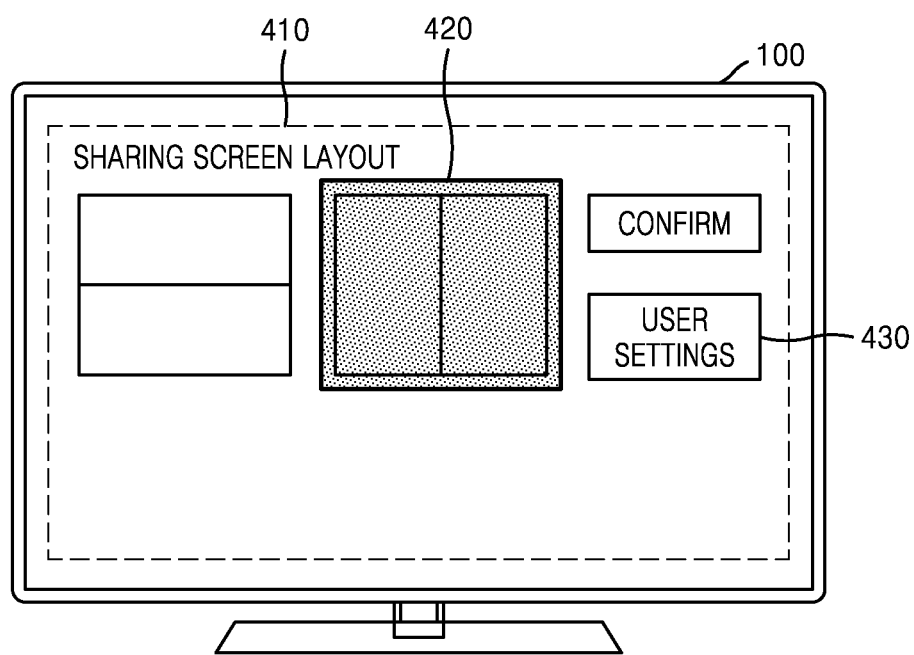
FIG. 4 is a diagram illustrating an example of a menu screen through which a layout of a sharing screen may be set, according to various embodiments

FIG. 4 is a diagram illustrating an example of a menu screen through which a layout of a sharing screen may be set, according to various embodiments.

According to an embodiment of the disclosure, the display device 100 may determine a layout of a sharing screen, based on the number of a plurality of electronic devices to share the screen.

According to an embodiment of the disclosure, when a plurality of electronic devices for screen sharing are selected, the display device 100 may set a layout of a sharing screen.

Referring to FIG. 4, according to an embodiment of the disclosure, the display device 100 may display a menu 410 for setting a layout of a sharing screen. The display device 100 may obtain candidates for a layout of a sharing screen based on the number of a plurality of electronic devices to share the screen. For example, as shown in FIG. 4, when there are two electronic devices to share the screen, the display device 100 may obtain, as candidate layouts, layouts for splitting its screen into two regions. The display device 100 may display the candidate layouts on the menu 410.

The display device 100 may determine a layout of the sharing screen based on a user input for selecting one of the candidate layouts included in the menu 410. For example, the display device 100 may determine a second layout 420 among the candidate layouts to be the layout of the sharing screen.

Alternatively, the display device 100 may provide a menu that allows a user to arbitrarily set a layout of the sharing screen based on a user input for selecting a user settings item 430 included in the menu 410. However, the disclosure is not limited thereto.

Figure 5:
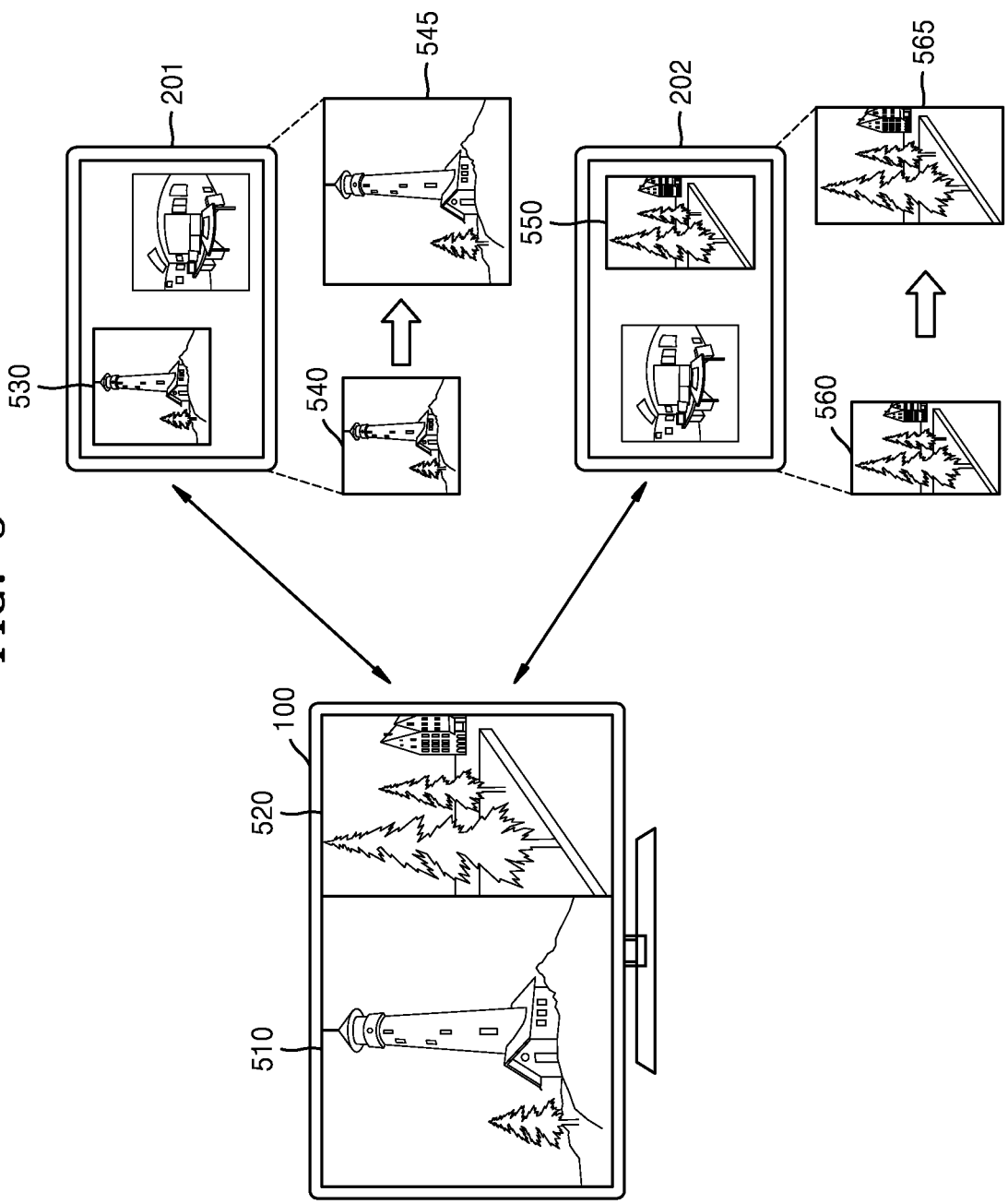
FIG. 5 is a diagram illustrating an example method, performed by a display device, of sharing screens with a first electronic device and a second electronic device, according to various embodiments.

FIG. 5 is a diagram illustrating an example method, performed by a display device, of sharing screens with a first electronic device and a second electronic device, according to various embodiments.

Referring to FIG. 5, according to an embodiment of the disclosure, the display device 100 may split its screen into a plurality of regions according to a layout of the screen. For example, the display device 100 may split the screen into a first region 510 and a second region 520.

According to an embodiment of the disclosure, the display device 100 may obtain pieces of display information respectively corresponding to the first region 510 and the second region 520. For example, the display device 100 may obtain first display information including at least one of a size, a resolution, or an aspect ratio of the first region 510. Alternatively, the display device 100 may obtain second display information including at least one of a size, a resolution, or an aspect ratio of the second region 520.

In this case, the first display information and the second display information may be information prestored in the display device 100. For example, when the layout of the screen of the display device 100 shown in FIG. 5 is a layout preset in the display device 100, pieces of display information regarding a plurality of regions included in the layout may be prestored in the display device 100 together with the layout. However, the disclosure is not limited thereto.

According to an embodiment of the disclosure, the display device 100 may transmit the pieces of display information respectively regarding the plurality of regions to electronic devices respectively corresponding to the plurality of regions. According to an embodiment of the disclosure, the display device 100 may determine or change, based on a user input, an electronic device corresponding to each of the plurality of regions in the screen.

According to an embodiment of the disclosure, the display device 100 may identify the first electronic device 201 corresponding to the first region 510 and the second electronic device 202 corresponding to the second region 520. The display device 100 may transmit the first display information to the first electronic device 201 and the second display information to the second electronic device 202.

Referring to FIG. 5, the first electronic device 201 may set a target region to be shared on the display device 100. The first electronic device 201 may set the entire screen or a part of the screen as the target region to be shared. For example, the first electronic device 201 may execute a plurality of applications and display a plurality of windows corresponding to the plurality of applications on the screen. The first electronic device 201 may receive a user input for selecting a specific application or a specific window, and set, based on the user input, a window corresponding to the selected specific application or the selected specific window as a target region 530 to be shared.

The first electronic device 201 may adjust, based on the first display information received from the display device 100, display information regarding a first image 540 in the target region 530 to be shared. For example, the first electronic device 201 may adjust at least one of a size, a resolution, or an aspect ratio of the first image 540 to at least one of the corresponding size, resolution, or aspect ratio included in the first display information. The first electronic device 201 may scale the resolution of the first image 540 to a first resolution included in the first display information.

The first electronic device 201 may transmit a scaled first image 545 to the display device 100. However, the disclosure is not limited thereto.

Alternatively, the second electronic device 202 may set the entire screen or a part of the screen as a target region to be shared. For example, the second electronic device 202 may execute a plurality of applications and display a plurality of windows corresponding to the plurality of applications on the screen. The second electronic device 202 may receive a user input for selecting a specific application or a specific window, and set, based on the user input, a window corresponding to the selected specific application or the selected specific window as a target region 550 to be shared.

The second electronic device 202 may adjust, based on the second display information received from the display device 100, display information regarding a second image 560 in the target region 550 to be shared. For example, the second electronic device 202 may adjust at least one of a size, a resolution, or an aspect ratio of the second image 560 to at least one of the corresponding size, resolution, or aspect ratio included in the second display information. The second electronic device 202 may scale the resolution of the second image 560 to a second resolution included in the second display information.

The second electronic device 202 may transmit a scaled second image 565 to the display device 100. However, the disclosure is not limited thereto.

The display device 100 may display the scaled first image 545 in the first region 510 and display the scaled second image 565 in the second region 520.

Figure 6:
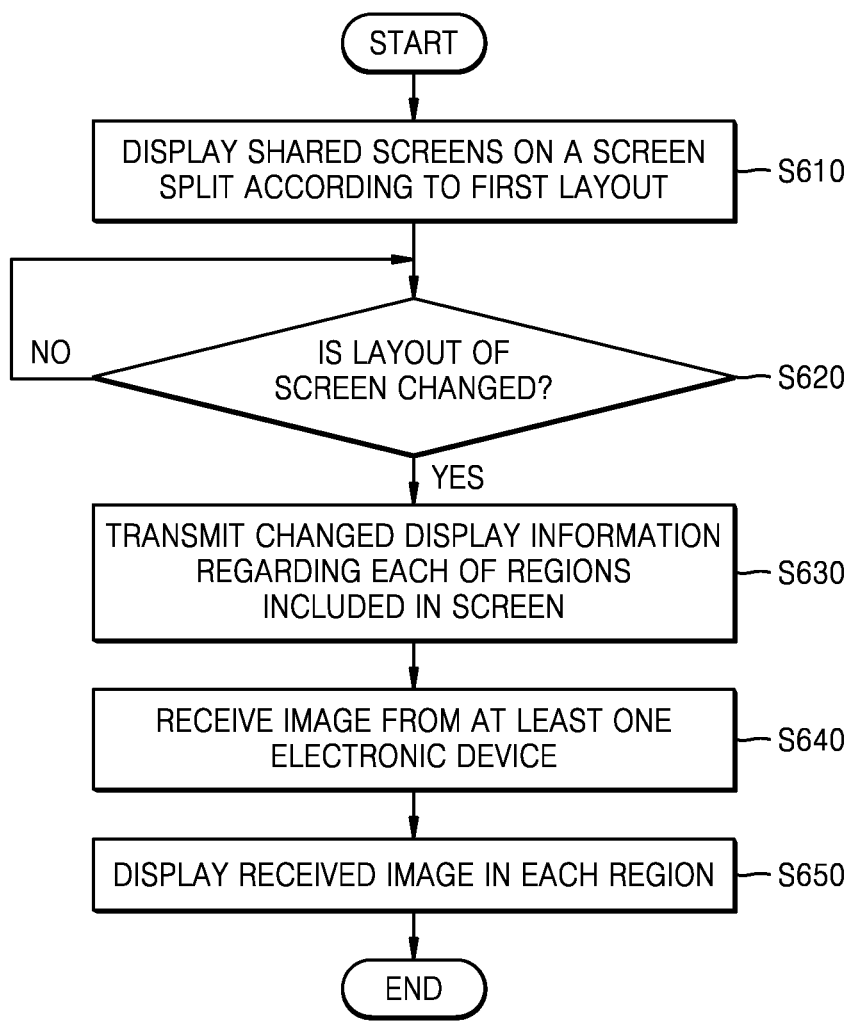
FIG. 6 is a flowchart illustrating an example method, performed by a display device, of performing screen sharing with a plurality of electronic devices according to various embodiments.

FIG. 6 is a flowchart illustrating an example method, performed by a display device, of performing screen sharing with a plurality of electronic devices according to various embodiments.

Referring to FIG. 6, according to an embodiment of the disclosure, the display device 100 may split its screen into a first region and a second region according to a first layout, and display a first image received from the first electronic device 201 in the first region and a second image received from a second electronic device 202 in the second region (S610). Because this has been described in detail with reference to FIGS. 2 and 5, a detailed description thereof may not be repeated here.

According to an embodiment of the disclosure, the display device 100 may detect a change in a layout of the screen (S620). For example, the display device 100 may change a layout of the screen based on a user input. Alternatively, the display device 100 may change the layout of the screen when an electronic device whose screen is to be shared on the display device 100 is added or when an electronic device whose screen has been shared on the display device 100 is disconnected. However, the disclosure is not limited thereto.

For example, the layout of the screen may be changed from the first layout to a second layout.

When detecting that the layout of the screen is changed, according to an embodiment of the disclosure, the display device 100 may transmit changed pieces of display information respectively regarding a plurality of regions included in the screen to electronic devices respectively corresponding to the plurality of regions (S630).

For example, when the layout of the screen is changed to the second layout, the display device 100 may change the number or size of the regions included in the screen according to the second layout. As the number or size of the plurality of regions included in the screen is changed, pieces of display information respectively regarding the plurality of regions are also changed. The display device 100 may transmit the changed pieces of display information respectively regarding the plurality of regions included in the screen to the electronic devices respectively corresponding to the regions.

According to an embodiment of the disclosure, the display device 100 may receive an image to be shared from at least one electronic device (S640), and display the received at least one image in a corresponding region (S650).

A screen sharing method of FIG. 6 is described in greater detail below with reference to FIGS. 7, 8, 9 and 10.

Figure 7:
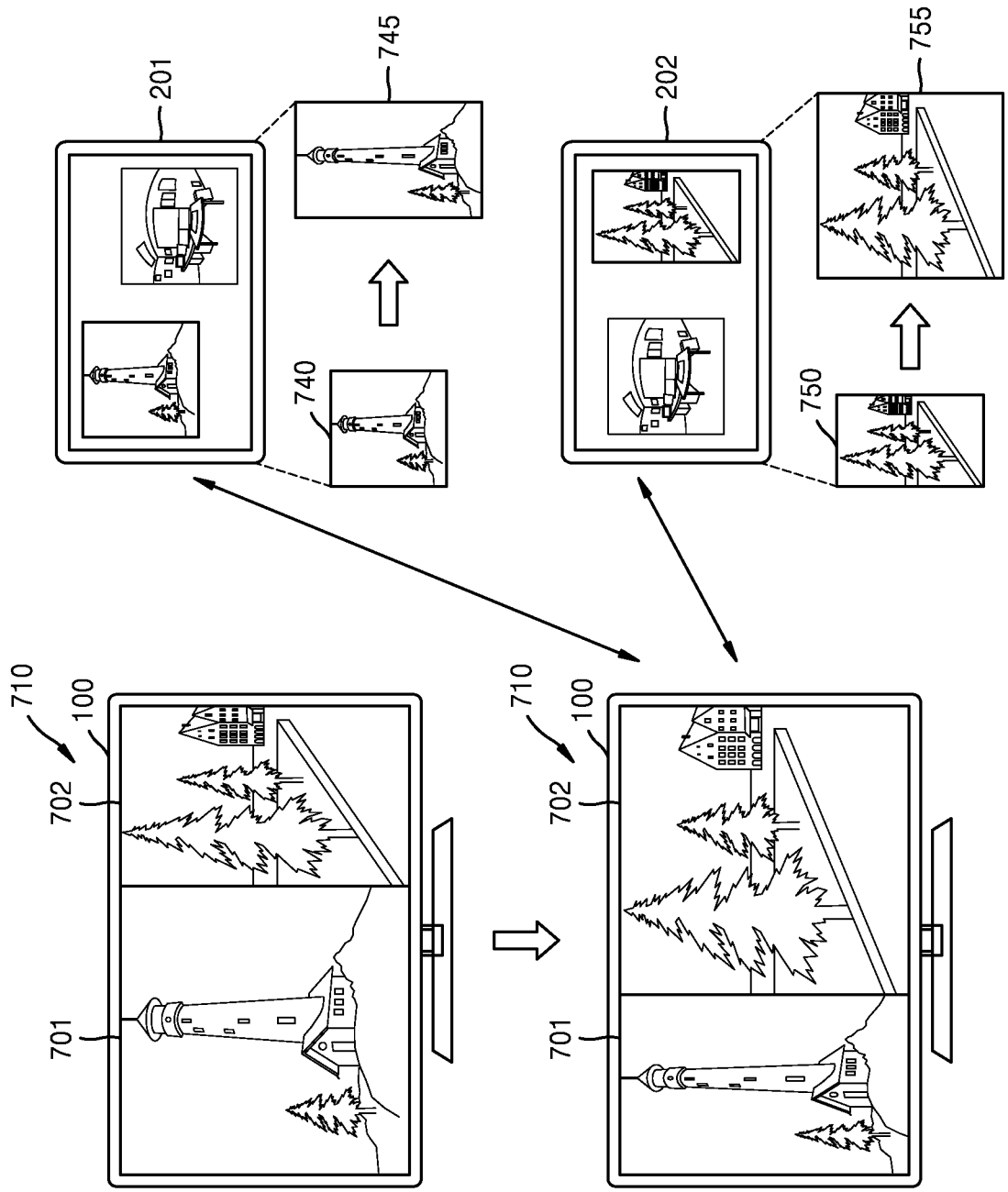
FIG. 7 is a diagram illustrating an example method, performed by a display device, of sharing screens with electronic devices when a layout of a screen of the display device is changed, according to various embodiments.

FIG. 7 is a diagram illustrating an example method, performed by a display device, of sharing screens with electronic devices when a layout of a screen of the display device is changed, according to various embodiments.

Referring to FIG. 7, according to an embodiment of the disclosure, the display device 100 may split the screen into a first region 701 having a first size and a second region 702 having a second size according to a first layout 710, and display a first image received from the first electronic device 201 in the first region 701 and a second image received from the second electronic device 202 in the second region 702. In this case, the first image may be an image scaled based on first display information, and the second image may be an image scaled based on second display information. For example, the received first image may have a first resolution included in the first display information, and the second image may have a second resolution included in the second display information.

According to an embodiment of the disclosure, the display device 100 may change a layout of the screen from the first layout 710 to a second layout 720 based on a user input. The display device 100 may adjust, according to the second layout 720, the size of the first region 701 from the first size to a third size and the size of the second region 702 from the second size to a fourth size.

As the sizes of the first region 701 and the second region 702 are changed, the first display information regarding the first region 701 and the second display information regarding the second region 702 may also be changed. For example, at least one of a size, a resolution, or an aspect ratio included in the first display information may be changed. For example, the resolution included in the first display information may be changed from the first resolution to a third resolution. However, the disclosure is not limited thereto.

Also, at least one of a size, a resolution, or an aspect ratio included in the second display information may be changed. For example, the resolution included in the second display information may be changed from the second resolution to a fourth resolution. However, the disclosure is not limited thereto.

The display device 100 may transmit the changed first display information to the first electronic device 201. Accordingly, the first electronic device 201 may scale the first image 740 to the third resolution based on the changed first display information, and transmit a scaled first image 745 to the display device 100.

Furthermore, the display device 100 may transmit the changed second display information to the second electronic device 202. Accordingly, the second electronic device 202 may scale the second image 750 to the fourth resolution based on the changed second display information, and transmit a scaled second image 755 to the display device 100.

The display device 100 may receive the scaled first image 745 obtained via scaling to the third resolution to display it in the first region 701 having the third size, and receive the scaled second image 755 obtained via scaling to the fourth resolution to display it in the second region 702 having the fourth size.

Figure 8:
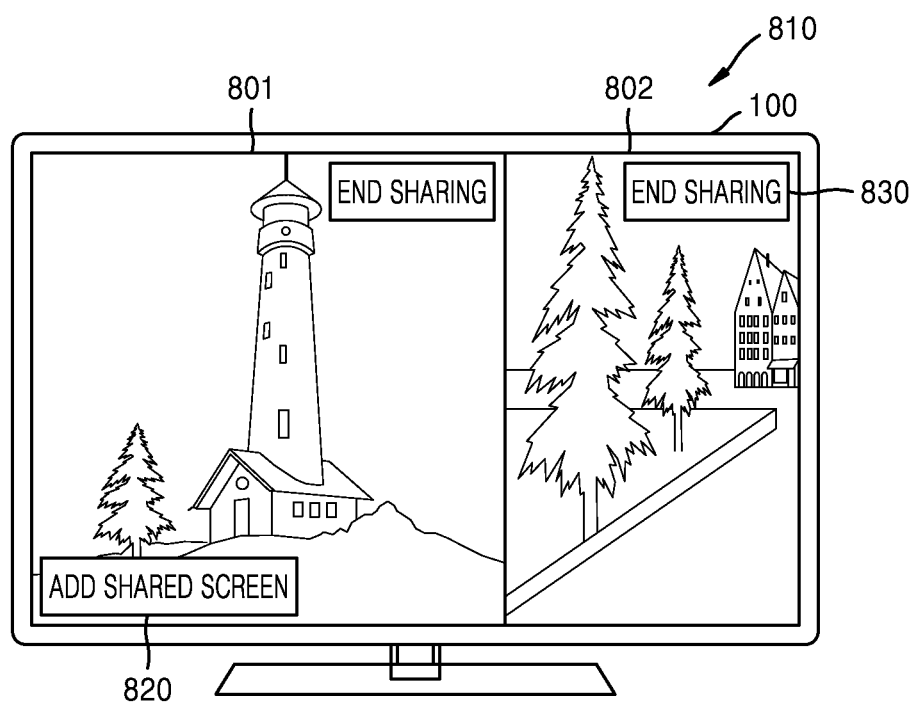
FIGS. 8, 9 and 10 are diagrams illustrating an example method, performed by a display device, of sharing screens with electronic devices when an electronic device whose screen is shared is changed, according to various embodiments.
Figure 9:
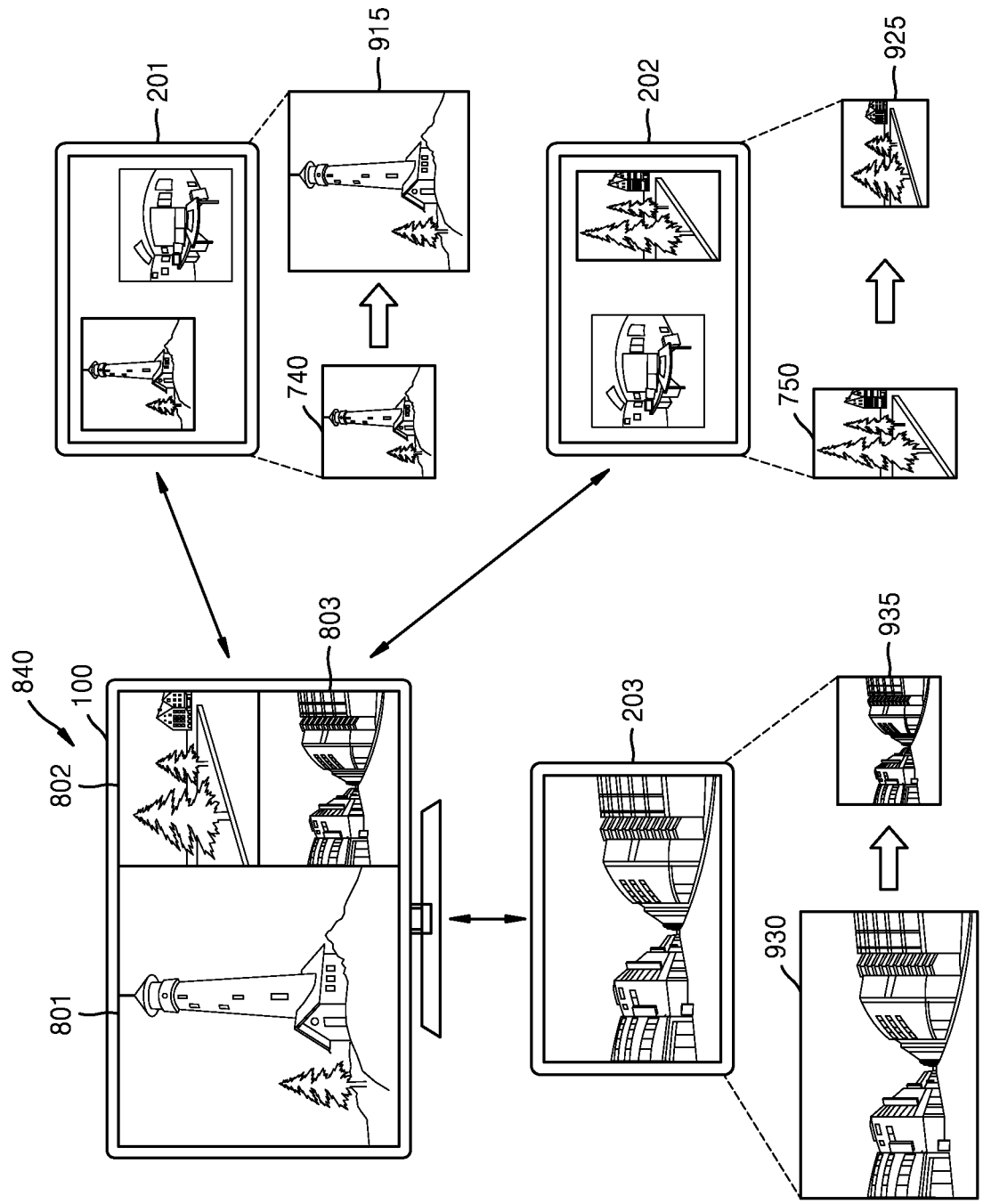
Figure 10:
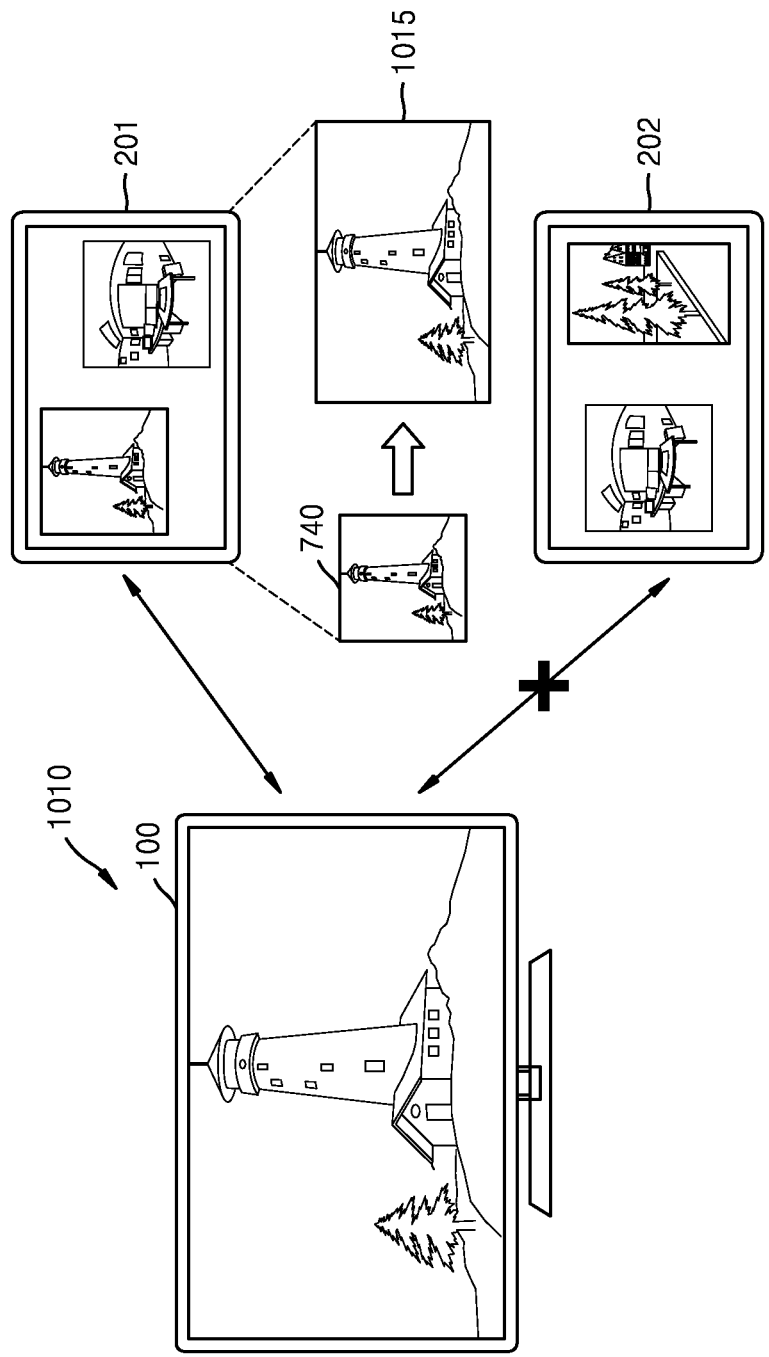

FIGS. 8, 9 and 10 are diagrams illustrating an example method, performed by a display device, of sharing screens with electronic devices when an electronic device whose screen is shared is changed, according to various embodiments.

Referring to FIG. 8, according to an embodiment of the disclosure, the display device 100 may split the screen into a first region 801 having a first size and a second region 802 having a second size according to a first layout 810, and display a first image received from the first electronic device 201 in the first region 801 and a second image received from the second electronic device 202 in the second region 802. In this case, the first image may be an image scaled based on first display information, and the second image may be an image scaled based on second display information. For example, the received first image may have a first resolution included in the first display information, and the second image may have a second resolution included in the second display information.

Because this has been described in detail with reference to FIG. 5, a detailed description thereof may not be repeated here.

According to an embodiment of the disclosure, the display device 100 may add an electronic device that shares a screen. For example, as shown in FIG. 8, the display device 100 may display a shared screen addition item 820.

The display device 100 may display, based on a user input for selecting the shared screen addition item 820, the list 310 indicating the external electronic devices whose screens are capable of being shared as the communication connections with the display device 100 is completed, as illustrated and described with reference to FIG. 3. The display device 100 may add an electronic device whose screen is to be shared, based on a user input for selecting at least one electronic device whose screen is to be shared from the list 310.

Alternatively, based on the user input for selecting the shared screen addition item 820, the display device 100 may search for a new electronic device and perform a communication connection between the found new electronic device and the display device 100 to thereby add the new electronic device as an electronic device whose screen is to be shared. However, the disclosure is not limited thereto.

According to an embodiment of the disclosure, the display device 100 may change a layout of the screen when an electronic device whose screen is to be shared is added. For example, as shown in FIG. 9, when a third electronic device 203 is added as an electronic device whose screen is to be shared, the display device 100 may change a layout of the screen from the first layout 810 to a third layout 840.

The display device 100 may adjust, according to the third layout 840, the size of the first region 801 from the first size to a fifth size and the size of the second region 802 from the second size to a sixth size, and generate a third region 803.

As the size of the first region 801 and the size of the second region 802 are changed, the first display information regarding the first region 801 and the second display information regarding the second region 802 may also be changed. At least one of a size, a resolution, or an aspect ratio included in the first display information may be changed. For example, the resolution included in the first display information may be changed from the first resolution to a fifth resolution.

Also, at least one of a size, a resolution, or an aspect ratio included in the second display information may be changed. For example, the resolution included in the second display information may be changed from the second resolution to a sixth resolution.

The display device 100 may transmit the changed first display information to the first electronic device 201. Accordingly, the first electronic device 201 may scale the first image 740 to the fifth resolution based on the changed first display information, and transmit a scaled first image 915 to the display device 100.

Furthermore, the display device 100 may transmit the changed second display information to the second electronic device 202. Accordingly, the second electronic device 202 may scale the second image 750 to the sixth resolution based on the changed second display information, and transmit a scaled second image 925 to the display device 100.

The display device 100 may obtain third display information regarding the third region 803 and transmit the third display information to the third electronic device 203 corresponding to the third region 803. The third display information may include at least one of a size, a resolution, or an aspect ratio of the third region 803. Accordingly, the third electronic device 203 may adjust, based on the third display information, an image (e.g., a third image 930) in a target region to be shared. For example, the third electronic device 203 may adjust at least one of a size, a resolution, or an aspect ratio of the third image 930 to at least one of the corresponding size, resolution, or aspect ratio included in the third display information. The third electronic device 203 may scale the resolution of the third image 930 to a seventh resolution and transmit a scaled third image 935 to the display device 100. However, the disclosure is not limited thereto.

The display device 100 may receive the scaled first image 915 obtained via scaling to the fifth resolution to display it in the first region 801 having the fifth size, receive the scaled second image 925 obtained via scaling to the sixth resolution to display it in the second region 802 having the sixth size, and receive the scaled third image 935 obtained via scaling to the seventh resolution to display it in the third region 803.

According to an embodiment of the disclosure, the display device 100 may disconnect at least one of electronic devices whose screens are shared on the display device 100. For example, as shown in FIG. 8, the display device 100 may display a sharing end item 830 to end screen sharing.

The display device 100 may end screen sharing based on a user input for selecting the sharing end item 830.

According to an embodiment of the disclosure, the display device 100 may change a layout of the screen when sharing of at least one screen among shared screens ends. For example, as shown in FIG. 10, when sharing of a screen of the second electronic device 202, which was displayed in the second region 802, ends, the display device 100 may change the layout of the screen from the first layout 810 to a fourth layout 1010. The display device 100 may integrate a first region and a second region into a single one according to the fourth layout 1010.

As the first region and the second region are integrated into one region, first display information regarding the first region may be changed. As the first region changes to the entire region of the screen, at least one of a size, a resolution, or an aspect ratio included in the first display information may change. For example, the resolution included in the first display information may be changed to the native resolution of the display device 100.

The display device 100 may transmit the changed first display information to the first electronic device 201. Accordingly, the first electronic device 201 may scale the first image 740 to the native resolution of the display device 100 based on the changed first display information, and transmit a scaled first image 1015 to the display device 100.

In addition, as sharing of the screen of the second electronic device 202 that was displayed in the second region ends, the display device 100 may not receive a second image from the second electronic device 202.

The display device 100 may receive the scaled first image 1015 obtained via scaling to the native resolution of the display device 100, and display it on the full screen of the display device 100.

Figure 11:
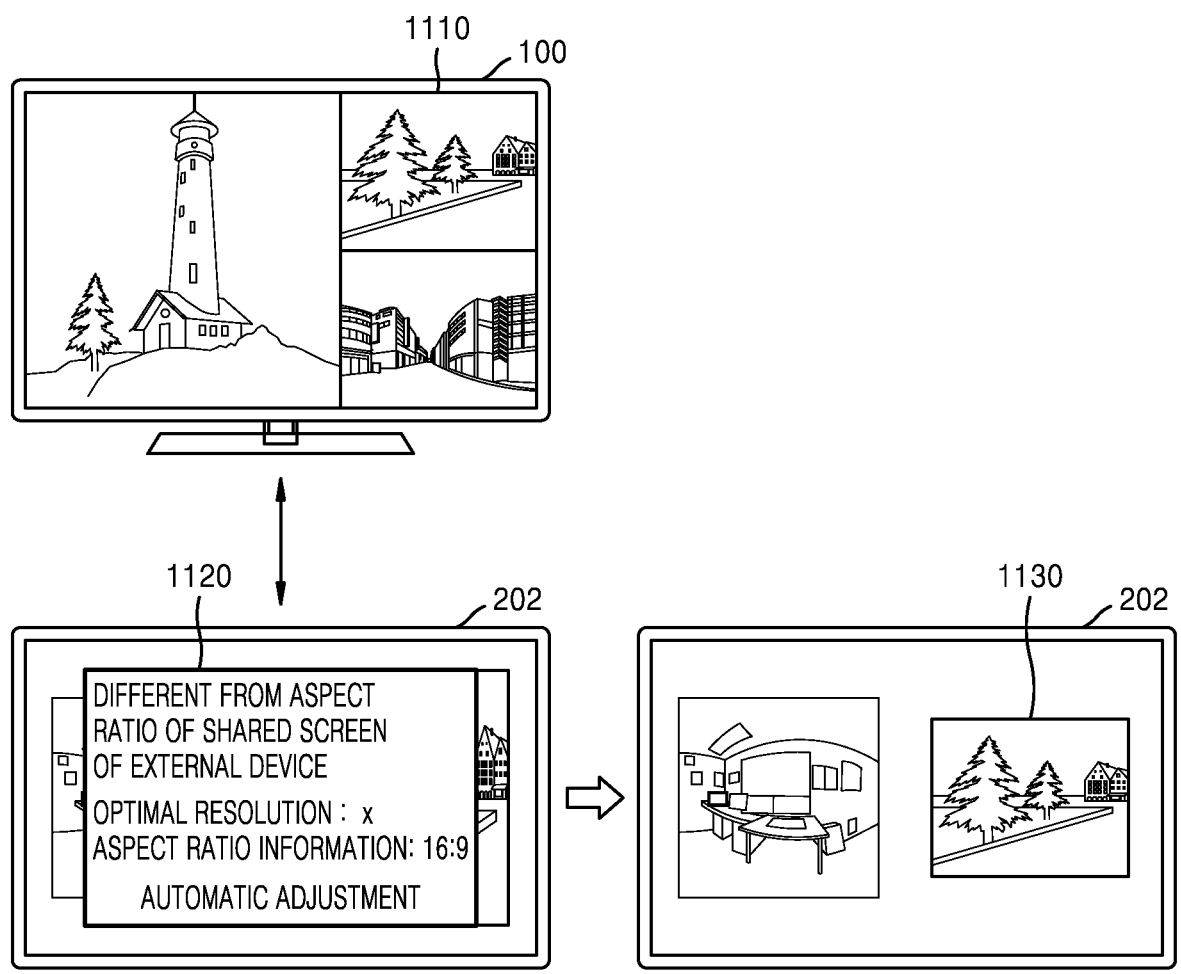
FIG. 11 is a diagram illustrating an example of adjusting a shared screen displayed on an electronic device when the electronic device shares its screen with a display device, according to various embodiments.

FIG. 11 is a diagram illustrating an example of adjusting a shared screen displayed on an electronic device when the electronic device shares its screen with a display device, according to various embodiments.

Referring to FIG. 11, according to an embodiment of the disclosure, the display device 100 may share screens of a plurality of electronic devices including the second electronic device 202.

The display device 100 may split its screen into a plurality of regions according to a layout of the screen. The display device 100 may transmit first display information corresponding to a second region 1110 to the second electronic device 202.

The second electronic device 202 may set a target region 1130 to be shared. The second electronic device 202 may scale, based on the first display information, an image in the target region 1130 to be shared. The second electronic device 202 may transmit a scaled image to the display device 100.

The display device 100 may display the image received from the second electronic device 202 in the second region 1110 among the plurality of regions.

According to an embodiment of the disclosure, the second electronic device 202 may identify whether second display information regarding the target region 1130 to be shared is different from the first display information corresponding to the second region 1110, which is received from the display device 100. For example, the second electronic device 202 may identify whether at least one of a size, a resolution, or an aspect ratio included in the first display information is different from at least one of the corresponding size, resolution, or aspect ratio included in the second display information.

As shown in FIG. 11, when the first display information is different from the second display information, the second electronic device 202 may display a message 1120 notifying that the first display information is different from the second display information. Furthermore, the second electronic device 202 may display the first display information (e.g., optimal resolution: 1280×720 and aspect ratio: 16:9). By referring to the displayed first display information, a user of the second electronic device 202 may adjust a size or an aspect ratio of the target region 1130 to be shared so that the target region 1130 has a size or an aspect ratio included in the first display information.

Also, according to an embodiment of the disclosure, the second electronic device 202 may display a screen automatic adjustment item 1140 together with the message 1120. When a user input for selecting the screen automatic adjustment item 1140 is received, the second electronic device 202 may adjust the size or aspect ratio of the target region 1130 based on the first display information. Accordingly, the image shared in the second region 1110 of the display device 100 may have the same display information as the image displayed in the target region 1130 of the second electronic device 202.

Figure 12:
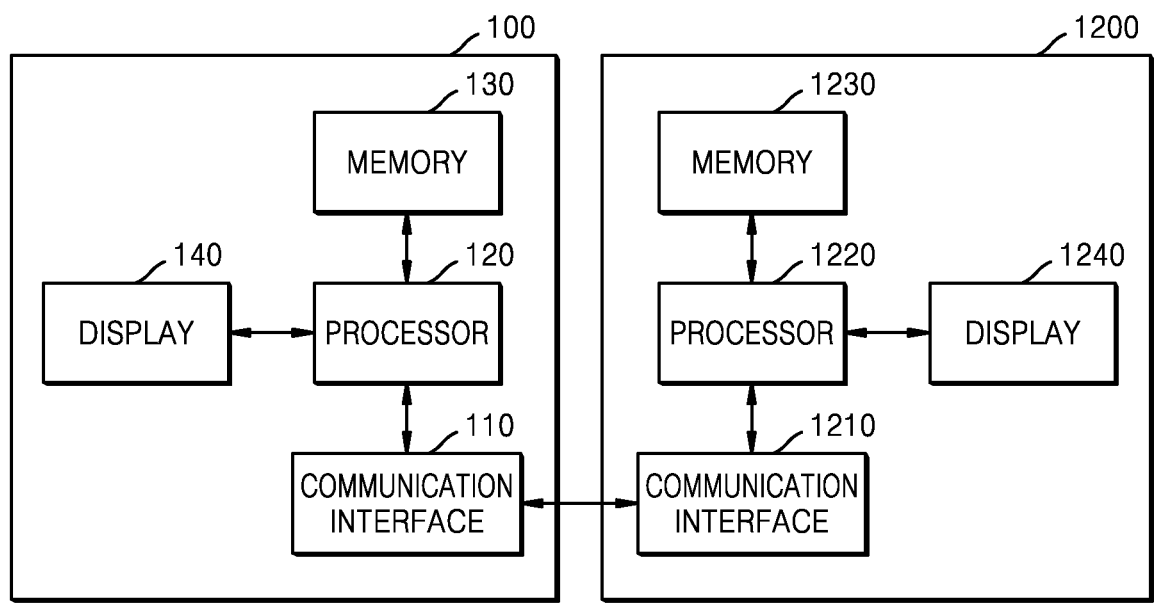
FIG. 12 is a block diagram illustrating an example configuration of a display device and an electronic device, according to various embodiments.

FIG. 12 is a block diagram illustrating example configurations of a display device and an electronic device, according to various embodiments.

Referring to FIG. 12, a display device 100 according to an embodiment of the disclosure may include a communication interface (e.g., including communication circuitry) 110, a processor (e.g., including processing circuitry) 120, a memory 130, and a display 140.

According to an embodiment of the disclosure, the communication interface 110 may include various communication circuitry and transmit and/or receive data or signals to or from an external device (e.g., an electronic device 1200) or a server. For example, the communication interface 110 may include various communication circuitry included in various modules, such as, for example, and without limitation, a Wi-Fi module, a Bluetooth module, an infrared (IR) communication module, a wireless communication module, a local area network (LAN) module, an Ethernet module, a wired communication module, etc. In this case, each communication module may be implemented in the form of at least one hardware chip.

The Wi-Fi module and the Bluetooth module perform communications according to a Wi-Fi method and a Bluetooth method, respectively. When the Wi-Fi module or the Bluetooth module are used, various types of connection information such as a service set identifier (SSID) and a session key may be first transmitted and received, a communication connection may be established using the connection information, and then various types of information may be transmitted and received. The wireless communication module may include at least one communication chip for performing communication according to various communication standards such as ZigBee, 3rd generation (3G), 3rd Generation Partnership Project (3GPP), long-term evolution (LTE), LTE Advanced (LTE-A), 4th generation (4G), 5th generation (5G), etc.

According to an embodiment of the disclosure, the communication interface 110 may perform communication for screen sharing with the electronic device 1200 according to an embodiment of the disclosure. For example, the communication interface 110 may share data with the electronic device 1200 using a Web RTC scheme. However, the disclosure is not limited thereto.

Furthermore, the communication interface 110 may transmit, to the electronic device 1200, display information regarding a region corresponding to the electronic device 1200. In addition, the communication interface 110 may receive, from the electronic device 1200, image data (an image stream) to be shared on a screen of the display device 100.

According to an embodiment of the disclosure, the communication interface 110 may receive a control signal, a control command, or the like from an external control device. For example, the communication interface 110 may include an IR module capable of transmitting and receiving signals to and from an external control device according to IR communication standards. In detail, the communication interface 110 may receive, from the control device, a control signal or a control command corresponding to a user input (e.g., a key or button input on the control device, etc.).

According to an embodiment of the disclosure, the processor 120 may include various processing circuitry and controls all the operations of the display device 100 and a flow of signals between the internal components of the display device 100 and performs a function of processing data.

The processor 120 may include a single core, a dual core, a triple core, a quad core, or a number of cores equal to multiples of thereof. Furthermore, the processor 120 may include a plurality of processors. For example, the processor 120 may be implemented as a main processor (not shown) and a sub processor (not shown) operating in a sleep mode.

In addition, the processor 120 may include at least one of a central processing unit (CPU), a graphics processing unit (GPU), or a video processing unit (VPU). Alternatively, according to an embodiment of the disclosure, the processor 120 may be implemented as a system on chip (SOC) that integrates at least one of a CPU, a GPU, or a VPU. Alternatively, the processor 120 may further include a neural processing unit (NPU).

According to an embodiment of the disclosure, the memory 130 may store various pieces of data, programs, or applications for driving and controlling the display device 100.

Also, a program stored in memory 130 may include one or more instructions. A program (one or more instructions) or an application stored in the memory 130 may be executed by the processor 120.

According to an embodiment of the disclosure, the processor 120 may execute an application for screen sharing based on a user input. The processor 120 may search for the electronic device 1200 using the application for screen sharing, and request a communication connection for screen sharing from the found electronic device 1200.

The processor 120 may determine a plurality of electronic devices whose screens are to be shared. For example, the processor 120 may control the display 140 to display a list indicating external electronic devices whose screens are capable of being shared as communication connections with the display device 100 are completed. The processor 120 may determine a plurality of electronic devices whose screens are to be shared, based on a user input for selecting the plurality of electronic devices from the list.

When the plurality of electronic devices whose screens are to be shared are determined, the processor 120 may determine a layout of a screen, based on the number of the plurality of electronic devices.

The processor 120 may split the screen into a plurality of regions according to the layout of the screen and obtain pieces of display information respectively corresponding to the plurality of regions. For example, the processor 120 may obtain at least one of a size, a resolution, or an aspect ratio of each of the plurality of regions.

The processor 120 may control the communication interface 110 to transmit the pieces of display information respectively regarding the plurality of regions to electronic devices respectively corresponding to the plurality of regions. For example, the processor 120 may identify a first electronic device corresponding to a first region and identify a second electronic device corresponding to a second region. The processor 120 may control the communication interface 110 to transmit first display information corresponding to the first region to the first electronic device and second display information corresponding to the second region to the second electronic device.

Also, when receiving a plurality of images from the plurality of electronic devices, the processor 120 may control the display 140 to respectively display the plurality of images in the regions obtained by splitting the screen. For example, when receiving a first image from the first electronic device and a second image from the second electronic device, the processor 120 may control the display 140 to display the first image in the first region and the second image in the second region.

According to an embodiment of the disclosure, the processor 120 may detect a change in the layout of the screen. For example, the processor 120 may detect that the layout of the screen is changed when the layout of the screen is changed based on a user input, an electronic device whose screen is to be shared on the display device 100 is added, or an electronic device whose screen has been shared on the display device 100 is disconnected. However, the disclosure is not limited thereto.

When detecting that the layout of the screen is changed, the processor 120 may transmit changed pieces of display information respectively regarding the plurality of regions included in the screen to the electronic devices respectively corresponding to the plurality of regions.

For example, when the layout of the screen is changed from a first layout to a second layout, the processor 110 may change the number or size of the regions included in the screen according to the second layout. As the number or size of the plurality of regions included in the screen is changed, pieces of display information respectively regarding the plurality of regions are also changed. The processor 120 may control the communication interface 110 to transmit the changed pieces of display information respectively regarding the plurality of regions included in the screen to the electronic devices respectively corresponding to the regions.

According to an embodiment of the disclosure, the display 140 generates a driving signal by converting an image signal, a data signal, an on-screen display (OSD) signal, a control signal, etc. processed by the processor 120. The display 140 may be implemented as a plasma display panel (PDP), a liquid crystal display (LCD), an organic light-emitting diode (OLED) display, a flexible display, or the like, and may also be implemented as a three-dimensional (3D) display. Furthermore, the display 140 may be formed as a touch screen to serve as an input device as well as an output device.

For example, the display 140 may respectively display images received from the plurality of electronic devices in the regions obtained via splitting.

The electronic device 1200 according to the embodiment of the disclosure may be any one of the plurality of electronic devices 200 shown and described with reference to FIG. 1, and may be any one of the first to third electronic devices 201, 202, and 203 shown and described with reference to FIGS. 2 and 5 to 11. However, the disclosure is not limited thereto.

According to an embodiment of the disclosure, the electronic device 1200 may include a communication interface (e.g., including communication circuitry) 1210, a processor (e.g., including processing circuitry) 1220, a memory 1230, and a display 1240. The communication interface 1210 may include various communication circuitry and communicate with the display device 100. For example, the communication interface 1210 may include various communication circuitry included in various modules, such as, for example, and without limitation, a Wi-Fi module, a Bluetooth module, an IR communication module, a wireless communication module, a local area network (LAN) module, an Ethernet module, a wired communication module, etc. In this case, each communication module may be implemented in the form of at least one hardware chip.

According to an embodiment of the disclosure, the communication interface 1210 may perform communication for screen sharing with the display device 100 according to the embodiment of the disclosure. For example, the communication interface 1210 may share data with the display device 100 using a Web RTC scheme. For example, the communication interface 1210 may receive display information from the display device 100 and transmit image data (an image stream) to be shared to the display device 100. However, the disclosure is not limited thereto.

According to an embodiment of the disclosure, the processor 1220 may include various processing circuitry and controls all the operations of the electronic device 1200 and a flow of signals between the internal components of the electronic device 1200 and performs a function of processing data.

The processor 1220 may include a single core, a dual core, a triple core, a quad core, or a number of cores equal to multiples thereof. Furthermore, the processor 1220 may include a plurality of processors. For example, the processor 1220 may be implemented as a main processor (not shown) and a sub processor (not shown) operating in a sleep mode.

In addition, the processor 1220 may include at least one of a CPU, a GPU, or a VPU. Alternatively, according to an embodiment of the disclosure, the processor 1220 may be implemented as an SOC that integrates at least one of a CPU, a GPU, or a VPU. Alternatively, the processor 1220 may further include an NPU.

According to an embodiment of the disclosure, the memory 1230 may store various pieces of data, programs, or applications for driving and controlling the electronic device 1200.

Also, a program stored in memory 1230 may include one or more instructions. A program (one or more instructions) or an application stored in the memory 1230 may be executed by the processor 1220.

According to an embodiment of the disclosure, the processor 1220 may execute an application for screen sharing based on a user input. The processor 1220 may search for the display device 100 using the application for screen sharing, and request a communication connection for screen sharing from the found display device 1200. When the communication connection with the display device 100 is completed, screen sharing may be initiated.

The processor 1220 may set, based on a user input, a target region to be shared on the display device 100. When the target region to be shared is set, the processor 1220 may scale an image in the target region based on display information received from the display device 100. For example, the processor 1220 may scale the image in the target region based on at least one of a size, a resolution, or an aspect ratio included in the received display information. The processor 1220 may control the communication interface 1210 to transmit a scaled image to the display device 100.

Furthermore, the processor 1220 may control the display 1240 to display a notification message when display information (e.g., first display information) regarding the target region to be shared is different from the display information (e.g., second display information) received from the display device 100.

In addition, the processor 1220 may adjust a size or an aspect ratio of the target region to be shared so that the target region has a size or an aspect ratio included in the second display information.

According to an embodiment of the disclosure, the display 1240 generates a driving signal by converting an image signal, a data signal, an OSD signal, a control signal, etc. processed by the processor 1220. The display 1240 may be implemented as a PDP, an LCD, an OLED display, a flexible display, or the like, and may also be implemented as a 3D display. Furthermore, the display 1240 may be formed as a touch screen to serve as an input device as well as an output device.

Figure 13:
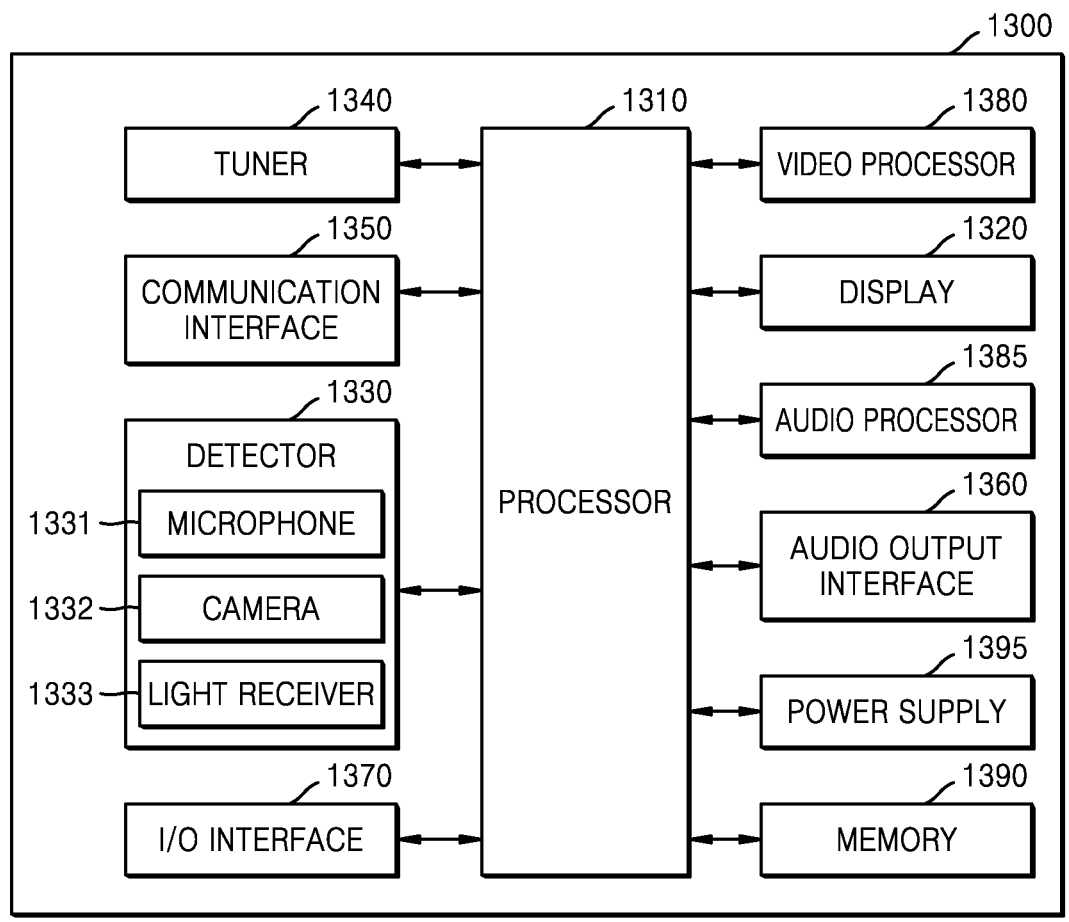
FIG. 13 is a block diagram illustrating an example configuration of a display device, according to various embodiments.

FIG. 13 is a block diagram illustrating an example configuration of a display device, according to various embodiments.

Referring to FIG. 13, a display device 1300 of FIG. 13 may be an embodiment of the display device 100 described with reference to FIGS. 1 to 12.

Referring to FIG. 13, the display device 1300 according to an embodiment of the disclosure may include a tuner 1340, a processor (e.g., including processing circuitry) 1310, a display 1320, a communication interface (e.g., including communication circuitry) 1350, a detector (e.g., including various detecting circuitry) 1330, an input/output (I/O) interface (e.g., including input/output circuitry) 1370, and a video processor (e.g., including video processing circuitry) 1380, an audio processor (e.g., including audio processing circuitry) 1385, an audio output interface (e.g., including audio output circuitry) 1360, a memory 1390, and a power supply 1395.

The communication interface 1350 of FIG. 13 corresponds to the communication interface 110 of FIG. 12, the processor 1310 of FIG. 13 corresponds to the processor 120 of FIG. 12, the memory 1390 of FIG. 13 corresponds to the memory 130 of FIG. 12, and the display 1320 of FIG. 13 corresponds to the display 140 of FIG. 12. Thus, descriptions already provided above with respect to FIG. 12 may not be repeated.

According to an embodiment of the disclosure, by performing amplification, mixing, resonance, etc. of a broadcast signal received in a wired or wireless manner, the tuner 1340 may tune and then select only a frequency of a channel that the display device 100 desires to receive from among many radio wave components. The broadcast signal includes audio, video, and additional information (e.g., an electronic program guide (EPG)).

The tuner 1340 may receive broadcast signals from various sources such as terrestrial broadcasting, cable broadcasting, satellite broadcasting, Internet broadcasting, etc. The tuner 1340 may receive a broadcast signal from a source such as analog broadcasting, digital broadcasting, or the like.

The detector 1330 may include various detecting circuitry and detects a user's voice, images, or interactions and may include a microphone 1331, a camera 1332, and a light receiver 1333.

The microphone 1331 may receive a voice uttered by the user. The microphone 1331 may convert the received voice into an electrical signal and output the electrical signal to the processor 1310. The user's voice may include, for example, a voice corresponding to a menu or function of the display device 1300.

The camera 1332 may receive an image (e.g., consecutive frames) corresponding to a user's motion including his or her gesture performed within a recognition range of the camera 1332. The processor 1310 may select a menu displayed on the display device 1300 based on the received motion recognition result or perform control corresponding to the motion recognition result.

The light receiver 1333 receives an optical signal (including a control signal) from an external control device via a light window (not shown) on a bezel of the display 1320. The light receiver 1333 may receive, from the control device, an optical signal corresponding to a user input (e.g., touching, pressing, touch gesture, voice, or motion). A control signal may be extracted from the received optical signal according to control by the processor 1310.

The I/O interface 1370 may include various I/O circuitry and receives video (e.g., a moving image, etc.), audio (e.g., voice, music, etc.), additional information (e.g., an EPG, etc.), etc. from outside of the display device 1300. The I/O interface 1370 may include one of an HDMI, a mobile high-definition link (MHL), a USB, a Thunderbolt, a video graphics array (VGA) port, an RGB port, a D-sub, a DVI, a component jack, and a PC port.

The processor 1310 may include various processing circuitry and controls all the operations of the display device 1300 and a flow of signals between the internal components of the display device 1300 and performs a function of processing data. When there is an input by the user or preset and stored conditions are satisfied, the processor 1310 may execute an operation system (OS) and various applications stored in the memory 1390.

The processor 1310 may include random access memory (RAM) that stores signals or data input from outside of the display device 1300 or is used as a storage area corresponding to various operations performed by the display device 1300, read-only memory (ROM) that stores a control program for controlling the display device 1300, and a processor.

The video processor 1380 may include various video processing circuitry and processes video data received by the display device 1300. The video processor 1380 may perform various types of image processing, such as decoding, scaling, noise removal, frame rate conversion, resolution conversion, etc. on the video data.

The audio processor 1385 may include various audio processing circuitry and processes audio data. The audio processor 1385 may perform various types of processing, such as decoding, amplification, noise removal, etc., on the audio data. Moreover, the audio processor 1385 may include a plurality of audio processing modules to process audio corresponding to a plurality of pieces of content.

The audio output interface 1360 may include various audio output circuitry and outputs audio contained in a broadcast signal received via the tuner 1340 according to control by the processor 1310. The audio output interface 1360 may output audio (e.g., a voice and a sound) input via the communication interface 1350 or the I/O interface 1370. Furthermore, the audio output interface 1360 may output audio stored in the memory 1390 according to control by the processor 1310. The audio output interface 1360 may include at least one of a speaker, a headphone output terminal, or a Sony/Phillips Digital Interface (S/PDIF) output terminal.

The power supply 1395 supplies, according to control by the processor 1310, power input by an external power source to the internal components of the display device 1300. The power supply 1395 may also supply, according to control by the processor 1310, power output from one or more batteries (not shown) located within the display device 1300 to the internal components.

The memory 1390 may store various pieces of data, programs, or applications for driving and controlling the display device 1300 according to control by the processor 1310. Although not shown in FIG. 13, the memory 1390 may include a broadcasting receiving module, a channel control module, a volume control module, a communication control module, a voice recognition module, a motion recognition module, a light receiving module, a display control module, an audio control module, an external input control module, a power control module, a power control module of a wirelessly (e.g., Bluetooth) connected external device, a voice database (DB), or a motion DB. The modules and DBs of the memory 1390 not shown in FIG. 3 may be implemented in the form of software in order to perform a broadcast reception control function, a channel control function, a volume control function, a communication control function, a voice recognition function, a motion recognition function, a light receiving control function, a display control function, an audio control function, an external input control function, a power control function, or a power control function of the wirelessly (e.g., Bluetooth) connected external device. The processor 1310 may perform the respective functions using the software stored in the memory 1390.

Moreover, the block diagrams of the display devices 100 and 1300 respectively illustrated in FIGS. 12 and 13 and the block diagram of the electronic device 1200 illustrated in FIG. 12 are block diagrams illustrating various example embodiments of the disclosure. The components in the block diagrams may be integrated, added, or omitted according to specifications of the display devices 100 and 1300 and the electronic device 1200 that are actually implemented. In other words, two or more components may be combined into a single component, or a single component may be subdivided into two or more components when necessary. Furthermore, functions performed in each block are intended to describe embodiments of the disclosure, and a specific operation or a device related to the functions does not limit the scope of the disclosure.

A display device according to an embodiment of the disclosure may share screens of a plurality of electronic devices.

According to an example embodiment of the disclosure, the display device may include a display, a communication interface comprising circuitry configured to transmit and/or receive data to and from the plurality of electronic devices, a memory storing one or more instructions, and at least one processor configured to execute the one or more instructions.

The at least one processor may be configured to execute the one or more instructions to split a screen of the display device into a plurality of regions and obtain pieces of display information respectively corresponding to the plurality of regions.

The at least one processor may be configured to execute the one or more instructions to control the communication interface to transmit first display information corresponding to a first region among the plurality of regions to a first electronic device corresponding to the first region among the plurality of electronic devices.

The at least one processor may be configured to execute the one or more instructions to control the communication interface to transmit second display information corresponding to a second region among the plurality of regions to a second electronic device corresponding to the second region among the plurality of electronic devices.

The at least one processor may be configured to execute the one or more instructions to receive, from the first electronic device, a first image obtained based on the first display information and receive, from the second electronic device, a second image obtained based on the second display information.

The at least one processor may be configured to execute the one or more instructions to control the display to display the first image in the first region and the second image in the second region.

The at least one processor may be configured to execute the one or more instructions to control the display to display a list including external electronic devices connected to the display device.

The at least one processor may be configured to execute the one or more instructions to determine the plurality of electronic devices based on a user input for selecting at least one of the external electronic devices included in the list.

The at least one processor may be configured to execute the one or more instructions to determine a layout of the screen based on the number of the plurality of electronic devices.

The at least one processor may be configured to execute the one or more instructions to split the screen into the plurality of regions according to the layout.

The at least one processor may be configured to execute the one or more instructions to control the display to display a layout list including a plurality of layouts.

The at least one processor may be configured to execute the one or more instructions to determine the layout of the screen based on a user input for selecting the layout included in the layout list.

The at least one processor may be configured to execute the one or more instructions to split the screen into the plurality of regions according to the layout.

The first image may include an image obtained by, based on the first display information, scaling an image in a region to be shared on a screen displayed on the first electronic device.

The second image may include an image obtained by, based on the second display information, scaling an image in a region to be shared on a screen displayed on the second electronic device.

The at least one processor may be configured to execute the one or more instructions to monitor cessation of sharing of the screens of the first electronic device and the second electronic device.

The at least one processor may be configured to execute the one or more instructions to change the layout of the screen based on the cessation of sharing of the screen of at least one of the first electronic device or the second electronic device.

The at least one processor may be configured to execute the one or more instructions to control the communication interface to transmit pieces of display information respectively corresponding to regions included in the changed layout to electronic devices respectively corresponding to the regions.

The at least one processor may be configured to execute the one or more instructions to monitor addition of a third electronic device whose screen is shared on the display device.

The at least one processor may be configured to execute the one or more instructions to change the layout of the screen based on the addition of the third electronic device.

The at least one processor may be configured to execute the one or more instructions to control the communication interface to transmit pieces of display information respectively corresponding to regions included in the changed layout to electronic devices respectively corresponding to the regions.

An electronic device according to an embodiment of the disclosure may share a screen thereof on a display device.

According to an example embodiment of the disclosure, the electronic device may include a display, a communication interface comprising circuitry configured to transmit and/or receive data to and from the display device, a memory storing one or more instructions, and at least one processor configured to execute the one or more instructions.

The at least one processor may be configured to execute the one or more instructions to receive first display information from the display device.

The at least one processor may be configured to execute the one or more instructions to scale, based on the first display information, an image in a target region to be shared on a screen displayed on the display.

The at least one processor may be configured to execute the one or more instructions to control the communication interface to transmit a scaled the image to the display device.

The at least one processor may be configured to execute the one or more instructions to control the display to display a notification message based on the first display information being different from second display information regarding the target region to be shared.

The at least one processor may be configured to execute the one or more instructions to control the display to display the notification message including the first display information.

The at least one processor may be configured to execute the one or more instructions to control the display to change and display the target region to be shared according to the first display information.

A method of operating a display device for sharing screens of a plurality of electronic devices, according to an embodiment of the disclosure, may include splitting a screen of the display device into a plurality of regions.

According to an example embodiment of the disclosure, the method of operating the display device may include obtaining pieces of display information respectively corresponding to the plurality of regions.

According to an example embodiment of the disclosure, the method of operating the display device may include transmitting first display information corresponding to a first region among the plurality of regions to a first electronic device corresponding to the first region among the plurality of electronic devices.

According to an example embodiment of the disclosure, the method of operating the display device may include transmitting second display information corresponding to a second region among the plurality of regions to a second electronic device corresponding to the second region among the plurality of electronic devices.

According to an example embodiment of the disclosure, the method of operating the display device may include receiving, from the first electronic device, a first image obtained based on the first display information.

According to an example embodiment of the disclosure, the method of operating the display device may include receiving, from the second electronic device, a second image obtained based on the second display information.

According to an example embodiment of the disclosure, the method of operating the display device may include displaying the first image in the first region and the second image in the second region.

According to an example embodiment of the disclosure, the method of operating the display device may include displaying a list including external electronic devices connected to the display device.

According to an example embodiment of the disclosure, the method of operating the display device may include determining the plurality of electronic devices based on a user input for selecting at least one of the external electronic devices included in the list.

According to an example embodiment of the disclosure, the method of operating the display device may include determining a layout of the screen based on the number of the plurality of electronic devices.

The splitting of the screen into the plurality of regions may include splitting the screen into the plurality of regions according to the layout.

According to an example embodiment of the disclosure, the method of operating the display device may include displaying a layout list including a plurality of layouts.

According to an example embodiment of the disclosure, the method of operating the display device may include determining the layout of the screen based on a user input for selecting the layout included in the layout list.

The splitting of the screen into the plurality of regions may include splitting the screen into the plurality of regions according to the layout.

The first image may be an image obtained by scaling, based on the first display information, an image in a region to be shared on a screen displayed on the first electronic device.

The second image may be an image obtained by scaling, based on the second display information, an image in a region to be shared on a screen displayed on the second electronic device.

According to an example embodiment of the disclosure, the method of operating the display device may include monitoring cessation of sharing of the screens of the first electronic device and the second electronic device.

According to an example embodiment of the disclosure, the method of operating the display device may include changing the layout of the screen based on the cessation of sharing of the screen of at least one of the first electronic device or the second electronic device.

According to an example embodiment of the disclosure, the method of operating the display device may include transmitting pieces of display information respectively corresponding to regions included in the changed layout to electronic devices respectively corresponding to the regions.

According to an example embodiment of the disclosure, the method of operating the display device may include monitoring addition of a third electronic device whose screen is shared on the display device.

According to an example embodiment of the disclosure, the method of operating the display device may include change the layout of the screen based on the addition of the third electronic device.

According to an example embodiment of the disclosure, the method of operating the display device may include transmitting pieces of display information respectively corresponding to regions included in the changed layout to electronic devices respectively corresponding to the regions.

An method of operating an electronic device for sharing a screen thereof on a display device, according to an example embodiment of the disclosure, may include receiving first display information from the display device.

According to an example embodiment of the disclosure, the method of operating the electronic device may include scaling, based on the first display information, an image in a target region to be shared on a screen displayed on a display.

According to an example embodiment of the disclosure, the method of operating the electronic device may include transmitting a scaled the image to the display device.

According to an example embodiment of the disclosure, the method of operating the electronic device may include displaying a notification message based on the first display information being different from second display information regarding the target region to be shared.

The displaying of the notification message may include displaying the notification message including the first display information.

According to an example embodiment of the disclosure, the method of operating the electronic device may include changing and displaying the target region to be shared according to the first display information.

At least one of an operation method of a display device according to an embodiment of the disclosure or an operation method of an electronic device according to an embodiment of the disclosure may be implemented in the form of program commands that may be performed by various types of computers, and may be recorded on non-transitory computer-readable recording media. The computer-readable recording media may include program commands, data files, data structures, etc. either alone or in combination. The program commands recorded on the computer-readable recording media may be designed and configured specially for the disclosure or may be known to and be usable by those of skill in the art of computer software. Examples of the computer-readable recording media include magnetic media such as hard disks, floppy disks, and magnetic tapes, optical media such as compact disk ROM (CD-ROM) and digital versatile disks (DVDs), magneto-optical media such as floptical disks, and hardware devices that are specially configured to store and perform program commands, such as ROM, RAM, flash memory, etc. Examples of program commands include not only machine code such as that created by a compiler but also high-level language code that may be executed by a computer using an interpreter or the like.

In addition, the at least one of the method of operating the display device or the method of operating the electronic device according to various example embodiments of the disclosure may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of an electronic device or through an electronic market (e.g., Google Play Store™, and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system including a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g., a cloud server, an artificial intelligence server, or the like) may execute the computer program product stored therein to control the client device communicatively connected to the server to perform the methods according to the embodiments of the disclosure.

While embodiments of the disclosure have been illustrated and described above with reference to various example embodiments, the example embodiments of the disclosure are not to be understood as limiting the scope of the disclosure, and various modifications and improvements made by those skilled in the art based on a basic concept of the disclosure also fall within the scope of the disclosure including the appended claims and their equivalents. It will also be understood that any of the embodiment(s) described herein may be used in conjunction with any other embodiment(s) described herein.

What is claimed is:

1. A display device configured to share screens of a plurality of electronic devices, the display device comprising:
   a display;
   a communication interface comprising circuitry configured to transmit and/or receive data to and from the plurality of electronic devices;

a memory storing one or more instructions; and at least one processor comprising processing circuitry and configured to execute the one or more instructions to:

obtain display information corresponding to a plurality of regions included in a screen of the display, control the communication interface to transmit first display information corresponding to a first region among the plurality of regions to a first electronic device corresponding to the first region among the plurality of electronic devices and transmit second display information corresponding to a second region among the plurality of regions to a second electronic device corresponding to the second region among the plurality of electronic devices, receive, from the first electronic device, a first image obtained based on the first display information and receive, from the second electronic device, a second image obtained based on the second display information, control the display to display the first image in the first region and the second image in the second region, and based on identifying that a layout of the screen is changed, control the communication interface to transmit changed first display information corresponding to the first region to the first electronic device and transmit changed second display information corresponding to the second region to the second electronic device.

2. The display device of claim 1, wherein the at least one processor is further configured to execute the one or more instructions to:

control the display to display a list including external electronic devices connected to the display device, and determine the plurality of electronic devices based on receiving an input for selecting at least one of the external electronic devices included in the list.

3. The display device of claim 1, wherein the at least one processor is further configured to execute the one or more instructions to: determine the layout of the screen based on the number of the plurality of electronic devices, and determine the plurality of regions included in the screen according to the layout.

4. The display device of claim 1, wherein the at least one processor is further configured to execute the one or more instructions to:

control the display to display a layout list including a plurality of layouts, and determine the layout of the screen based on receiving an input for selecting the layout included in the layout list, and determine the plurality of regions included in the screen according to the layout.

5. The display device of claim 1, wherein the first image includes an image obtained by scaling, based on the first display information, an image in a region to be shared on a screen displayed on the first electronic device, and the second image includes an image obtained by scaling, based on the second display information, an image in a region to be shared on a screen displayed on the second electronic device.

6. The display device of claim 1, wherein the at least one processor is further configured to execute the one or more instructions to:

monitor cessation of sharing of the screens of the first electronic device and the second electronic device, and change the layout of the screen based on the cessation of the sharing of the screen of at least one of the first electronic device or the second electronic device.

7. The display device of claim 1, wherein the at least one processor is further configured to execute the one or more instructions to:

monitor addition of a third electronic device whose screen is shared on the display device, and change the layout of the screen based on the addition of the third electronic device.

8. The display device of claim 1, wherein the at least one processor is further configured to execute the one or more instructions to:

receive a user input for changing at least one of a size, a location, a resolution, or an aspect ratio of the at least one of the first region or the second region, change the layout of the screen based on the user input.

9. The display device of claim 1, wherein the first display information includes at least one of a size, a resolution, or an aspect ratio of the first region and the second display information includes at least one of a size, a resolution, or an aspect ratio of the second region.

10. The display device of claim 1, wherein the at least one processor is further configured to execute the one or more instructions to:

receive, from the first electronic device, a third image obtained based on the changed first display information and receive, from the second electronic device, a fourth image obtained based on the changed second display information, and control the display to display the third image in the first region and the fourth image in the second region.

11. A method of operating a display device for sharing screens of a plurality of electronic devices, the method comprising:

obtaining of display information corresponding to a plurality of regions included in a screen of the display;

transmitting first display information corresponding to a first region among the plurality of regions to a first electronic device corresponding to the first region among the plurality of electronic devices;

transmitting second display information corresponding to a second region among the plurality of regions to a second electronic device corresponding to the second region among the plurality of electronic devices;

receiving, from the first electronic device, a first image obtained based on the first display information;

receiving, from the second electronic device, a second image obtained based on the second display information;

displaying the first image in the first region and the second image in the second region; and based on identifying that a layout of the screen is changed, transmitting changed first display information corresponding to the first region to the first electronic device and transmitting changed second display information corresponding to the second region to the second electronic device.

12. The method of claim 11, further comprising:

displaying a list including external electronic devices connected to the display device; and determining the plurality of electronic devices based on receiving an input for selecting at least one of the external electronic devices included in the list.

13. The method of claim 11, further comprising determining the layout of the screen based on the number of the plurality of electronic devices, determining the plurality of regions included in the screen according to the layout.

14. The method of claim 11, further comprising:

displaying a layout list including a plurality of layouts; and determining the layout of the screen based on receiving an input for selecting the layout included in the layout list, determining the plurality of regions included in the screen according to the layout.

15. The method of claim 11, wherein the first image includes an image obtained by scaling, based on the first display information, an image in a region to be shared on a screen displayed on the first electronic device, and the second image includes an image obtained by scaling, based on the second display information, an image in a region to be shared on a screen displayed on the second electronic device.

16. The method of claim 11, further comprising:

monitoring cessation of sharing of the screens of the first electronic device and the second electronic device; and changing the layout of the screen based on the cessation of the sharing of the screen of at least one of the first electronic device or the second electronic device.

17. The method of claim 11, further comprising:

monitoring addition of a third electronic device whose screen is shared on the display device; and changing the layout of the screen based on the addition of the third electronic device.

18. A non-transitory computer-readable recording medium having stored therein a program for performing operations corresponding to the method of claim 11.

19. The method of claim 11, further comprising:

receiving, from the first electronic device, a third image obtained based on the changed first display information and receiving, from the second electronic device, a fourth image obtained based on the changed second display information, and displaying the third image in the first region and the fourth image in the second region.

* * * * *